(12) United States Patent
Sheik et al.

(10) Patent No.: US 11,917,528 B2
(45) Date of Patent: Feb. 27, 2024

(54) ENHANCING STANDALONE ACQUISITION TIMELINES FOR MILLIMETER WAVE DEVICES

(71) Applicant: QUALCOMM Incorporated, San Diego, CA (US)

(72) Inventors: Ansah Ahmed Sheik, Hyderabad (IN); Sayak Saha, Hyderabad (IN); Srinivas Pola, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 17/397,738

(22) Filed: Aug. 9, 2021

(65) Prior Publication Data

US 2023/0041226 A1    Feb. 9, 2023

(51) Int. Cl.
*H04W 48/20* (2009.01)
*H04W 48/16* (2009.01)
*H04W 36/00* (2009.01)
*H04W 84/04* (2009.01)

(52) U.S. Cl.
CPC ....... *H04W 48/16* (2013.01); *H04W 36/0072* (2013.01); *H04W 48/20* (2013.01); *H04W 84/042* (2013.01)

(58) Field of Classification Search
CPC . H04W 48/16; H04W 36/0072; H04W 48/20; H04W 84/042
See application file for complete search history.

(56) References Cited

U.S. PATENT DOCUMENTS

| | | | |
|---|---|---|---|
| 2004/0176094 A1* | 9/2004 | Kim | H04W 36/0033 455/438 |
| 2018/0184330 A1 | 6/2018 | Egner et al. | |
| 2019/0281648 A1* | 9/2019 | Liu | H04W 76/19 |
| 2020/0107291 A1* | 4/2020 | Nayak | H04W 64/006 |
| 2020/0205060 A1* | 6/2020 | Karimli | H04W 24/10 |
| 2021/0211972 A1* | 7/2021 | Zhang | H04W 24/10 |

FOREIGN PATENT DOCUMENTS

CN          113225730 A * 8/2021 ........ H04W 36/0066

* cited by examiner

*Primary Examiner* — Said M Elnoubi
(74) *Attorney, Agent, or Firm* — Holland & Hart LLP

(57) ABSTRACT

Methods, systems, and devices for wireless communications are described. The method includes receiving, from a first base station, control signaling indicating one or more frequency bands on which one or more neighbor base stations operate that are associated with a first geographic location of the first base station, performing, based on the control signaling, a frequency scanning procedure using at least one frequency band of the one or more frequency bands to select a first neighbor base station of the one or more neighbor base stations, and establishing connectivity with the first neighbor base station based on the frequency scanning procedure.

28 Claims, 11 Drawing Sheets

| 305 | NCGI 1 | n257 / SCS120 | n260 / SCS240 | 2054683 |
| --- | --- | --- | --- | --- |
| 310 | NCGI 2 | n261 / SCS120 | 2071387 | |
| 315 | LTE CGI | 2054683 | | |
| ⋮ | ⋮ | ⋮ | ⋮ | ⋮ |
| 320 | NCGI 3 | 2016955 | n257 / SCS240 | n258 / SCS240 |

ENHANCING STANDALONE ACQUISITION TIMELINES FOR MILLIMETER WAVE DEVICES

FIELD OF TECHNOLOGY

The following relates to wireless communications, including enhancing standalone acquisition timelines for millimeter wave devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support procedures by which millimeter wave devices perform standalone acquisition for establishing connectivity with a network. The standalone acquisition may involve scanning procedures by which a UE detects frequency bands on which one or more base stations operate. In some cases, it may be desirable to enhance scanning procedures to reduce latency when establishing network connectivity.

SUMMARY

The described techniques relate to improved methods, systems, devices, and apparatuses that support enhancing standalone acquisition timelines for millimeter wave devices. Generally, the described techniques provide for a user equipment (UE) to receive control signaling from a first base station. The control signaling indicates one or more frequency bands on which neighbor base stations operate. The neighbor base stations may be associated with the geographic location of the first base station. The UE may perform a frequency scanning procedure based on the control signaling it receives from the first base station. The UE may use at least one frequency band of the one or more frequency bands indicated by the control signaling to select a first neighbor base station of the one or more neighbor base stations. The UE may establish connectivity with the first neighbor base station based on the frequency scanning procedure.

A method for wireless communication at a user equipment (UE) is described. The method may include receiving, from a first base station, control signaling indicating one or more frequency bands on which one or more neighbor base stations operate that are associated with a first geographic location of the first base station, performing, based on the control signaling, a frequency scanning procedure using at least one frequency band of the one or more frequency bands to select a first neighbor base station of the one or more neighbor base stations, and establishing connectivity with the first neighbor base station based on the frequency scanning procedure.

An apparatus for wireless communication at a UE is described. The apparatus may include a processor, memory coupled with the processor, and instructions stored in the memory. The instructions may be executable by the processor to cause the apparatus to receive, from a first base station, control signaling indicating one or more frequency bands on which one or more neighbor base stations operate that are associated with a first geographic location of the first base station, perform, based on the control signaling, a frequency scanning procedure using at least one frequency band of the one or more frequency bands to select a first neighbor base station of the one or more neighbor base stations, and establish connectivity with the first neighbor base station based on the frequency scanning procedure.

Another apparatus for wireless communication at a UE is described. The apparatus may include means for receiving, from a first base station, control signaling indicating one or more frequency bands on which one or more neighbor base stations operate that are associated with a first geographic location of the first base station, means for performing, based on the control signaling, a frequency scanning procedure using at least one frequency band of the one or more frequency bands to select a first neighbor base station of the one or more neighbor base stations, and means for establishing connectivity with the first neighbor base station based on the frequency scanning procedure.

A non-transitory computer-readable medium storing code for wireless communication at a UE is described. The code may include instructions executable by a processor to receive, from a first base station, control signaling indicating one or more frequency bands on which one or more neighbor base stations operate that are associated with a first geographic location of the first base station, perform, based on the control signaling, a frequency scanning procedure using at least one frequency band of the one or more frequency bands to select a first neighbor base station of the one or more neighbor base stations, and establish connectivity with the first neighbor base station based on the frequency scanning procedure.

In some examples of the method, apparatuses, and non-transitory computer-readable medium described herein, receiving the control signaling may include operations, features, means, or instructions for receiving the control signaling including a system information block indicating the one or more frequency bands on which the one or more neighbor base stations operate that may be associated with the first geographic location.

Some examples of the method, apparatuses, and non-transitory computer-readable medium described herein may further include operations, features, means, or instructions for receiving, from the first neighbor base station, second control signaling including a second system information block indicating one or more second frequency bands on which one or more second neighbor base stations operate that may be associated with a second geographic location.

Some examples of the method, apparatuses, and non-transitory computer-readable medium described herein may further include operations, features, means, or instructions for performing, based on the second control signaling, a second frequency scanning procedure using at least one frequency band of the one or more second frequency bands to select a second neighbor base station of the one or more second neighbor base stations and establishing connectivity with the second neighbor base station operating using a second frequency band of the one or more second frequency bands.

In some examples of the method, apparatuses, and non-transitory computer-readable medium described herein, performing the frequency scanning procedure may include operations, features, means, or instructions for performing the frequency scanning procedure to identify one or more additional frequency bands other than the one or more frequency bands indicated via the control signaling.

Some examples of the method, apparatuses, and non-transitory computer-readable medium described herein may further include operations, features, means, or instructions for storing, in a database, a link between the one or more frequency bands and the first geographic location.

Some examples of the method, apparatuses, and non-transitory computer-readable medium described herein may further include operations, features, means, or instructions for updating a database to associate the one or more frequency bands with the first geographic location.

In some examples of the method, apparatuses, and non-transitory computer-readable medium described herein, the updating includes associating a new radio cell global identifier of the first neighbor base station with the first frequency band.

Some examples of the method, apparatuses, and non-transitory computer-readable medium described herein may further include operations, features, means, or instructions for identifying one or more additional frequency bands other than the one or more frequency bands indicated via the control signaling based on querying an acquisition database indicating one or more base stations with which the UE previously established connectivity corresponding to the first geographic location, where the frequency scanning procedure may be performed using at least one frequency band of the one or more additional frequency bands.

Some examples of the method, apparatuses, and non-transitory computer-readable medium described herein may further include operations, features, means, or instructions for performing the frequency scanning procedure that prioritizes at least one operating frequency of the one or more additional frequency bands over a second frequency band based on the at least one operating frequency being in the acquisition database and the second frequency band not being included in the acquisition database.

In some examples of the method, apparatuses, and non-transitory computer-readable medium described herein, performing the frequency scanning procedure may include operations, features, means, or instructions for performing a scan to identify one or more cells and performing a band scan of one or more millimeter wave bands associated with the identified one or more cells, where the selecting of the first neighbor base station may be based on the performing the band scan of the one or more millimeter wave bands.

In some examples of the method, apparatuses, and non-transitory computer-readable medium described herein, performing the frequency scanning procedure may include operations, features, means, or instructions for performing a scan of one or more millimeter wave frequency bands that may be not associated with the control signaling or a scan of one or more millimeter wave bands associated with identified cells, where the selecting of the first neighbor base station may be based on the performing the scan of the one or more millimeter wave frequency bands.

In some examples of the method, apparatuses, and non-transitory computer-readable medium described herein, performing the frequency scanning procedure may include operations, features, means, or instructions for performing the frequency scanning procedure over a set of frequency bands in a prioritized order indicated in a list, or that indicates to prioritize scanning bands in frequency range one, or that indicates to prioritize scanning of one or more millimeter wave frequencies associated with the one or more neighbor base stations, or that indicates to prioritize scanning of one or more additional millimeter wave frequencies identified during a prior frequency scanning procedure associated with the first geographic location, or a combination thereof.

In some examples of the method, apparatuses, and non-transitory computer-readable medium described herein, performing the frequency scanning procedure may include operations, features, means, or instructions for performing the frequency scanning procedure that prioritizes scanning of at least one millimeter wave frequency of the one or more millimeter wave frequencies corresponding to the first base station over a second frequency band.

In some examples of the method, apparatuses, and non-transitory computer-readable medium described herein, performing the frequency scanning procedure may include operations, features, means, or instructions for scanning a millimeter wave operating frequency associated with a loss of service.

In some examples of the method, apparatuses, and non-transitory computer-readable medium described herein, performing the frequency scanning procedure may include operations, features, means, or instructions for identifying one or more secondary cell group cells corresponding to a dual connectivity mode, mapping the one or more secondary cell group cells to one or more primary cells, and adding the mapping and the one or more secondary cell group cells to a database.

In some examples of the method, apparatuses, and non-transitory computer-readable medium described herein, performing the frequency scanning procedure may include operations, features, means, or instructions for performing the frequency scanning procedure that prioritizes scanning one or more millimeter wave frequencies of the one or more frequency bands indicated in the control signaling.

In some examples of the method, apparatuses, and non-transitory computer-readable medium described herein, the one or more frequency bands includes one or more millimeter wave frequency bands or one or more millimeter wave frequencies, or a combination thereof.

In some examples of the method, apparatuses, and non-transitory computer-readable medium described herein, the frequency scanning procedure includes a cell reselection procedure, or a cell redirection procedure, or a cell handover procedure, or a combination thereof.

Some examples of the method, apparatuses, and non-transitory computer-readable medium described herein may further include operations, features, means, or instructions for associating a new radio cell global identifier of the first base station with the first geographic location of the first base station.

In some examples of the method, apparatuses, and non-transitory computer-readable medium described herein, the new radio cell global identifier includes a global cell identity based on a public land mobile network and a system information block type.

BRIEF DESCRIPTION OF THE DRAWINGS

FIG. 3 illustrates an example of a scanning sequence that supports enhancing standalone acquisition timelines for millimeter wave devices in accordance with aspects of the present disclosure.

DETAILED DESCRIPTION

Figure 1:
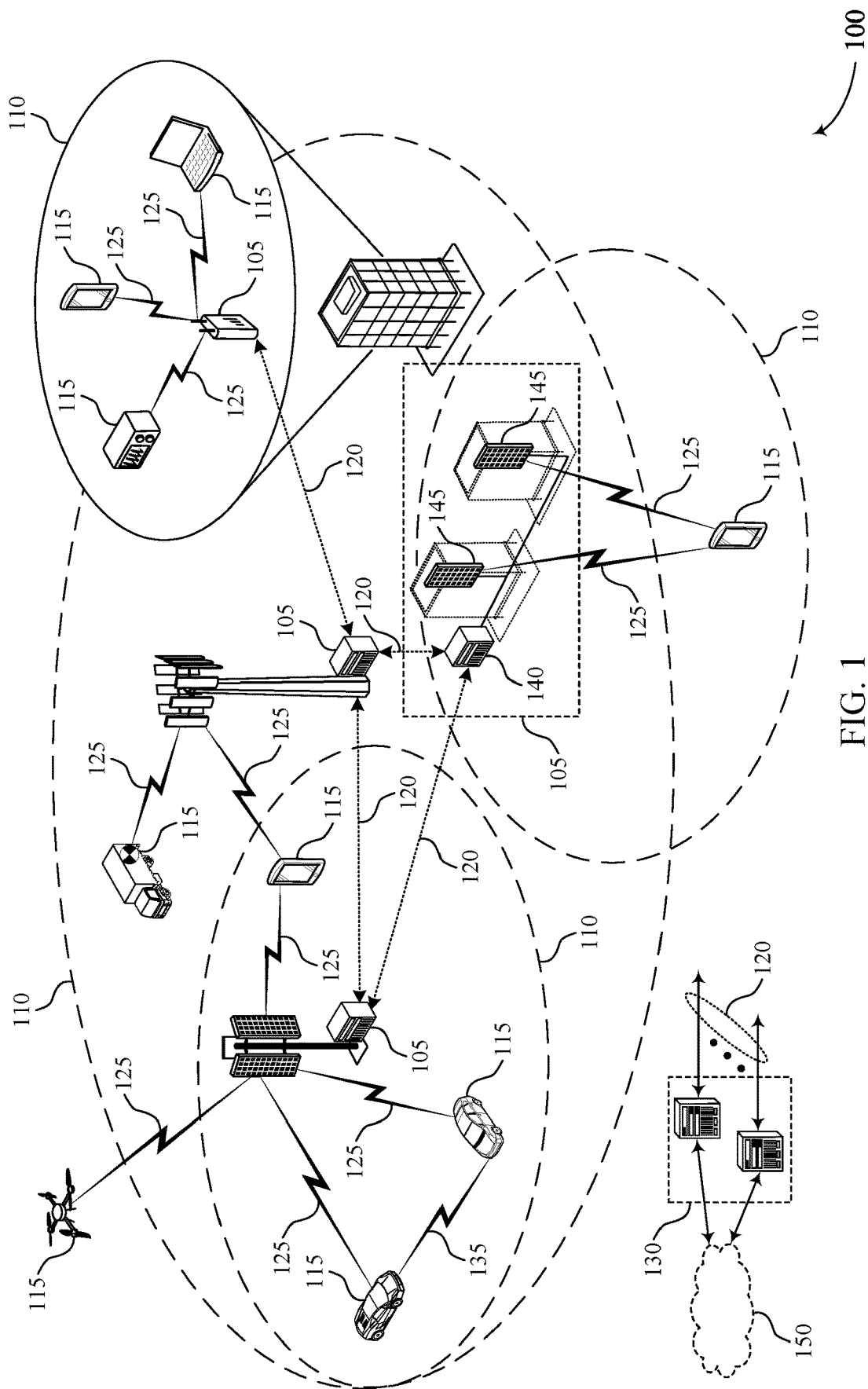
FIG. 1 illustrates an example of a wireless communications system that supports enhancing standalone acquisition timelines for millimeter wave devices in accordance with aspects of the present disclosure.

Wireless communications systems (e.g., 5G cellular systems, 5G NR systems) may be configured to support one or more frequency ranges. The one or more frequency ranges may include frequency range one (FR1) and frequency range two (FR2). FR1 may include frequencies 410 MHz to 7125 MHz, and FR2 may include frequencies 24.45 GHz to 52.6 GHz. The FR1 range may be referred to as sub-6 (e.g., includes sub-6 GHz frequency bands). In some cases, FR1 may overlap with LTE cellular frequencies (e.g., 700 MHz to 2700 MHz). The FR2 range may be referred to as millimeter wave (mmW) frequencies.

A UE may perform various types of scans (e.g., scans for synchronization signal blocks, etc.). The various types of scans may include full frequency scans (FFS) (e.g., band scans) where the UE scans each frequency within a frequency band as specified by a synchronization raster for scanned frequency bands. The various types of scans may include limited scans (e.g., list frequency scan) of some frequencies within a frequency band. Thus, a list frequency scan (LFS) may be a scan of a subset of frequencies specified in a synchronization raster for a given frequency band.

In some cases, a UE may be configured to create an acquisition database (ACQ DB) with one or more frequency groups. The ACQ DB may include a listing of cells for each of the one or more frequency groups the UE has successfully camped on previously. In some cases, the UE may search the ACQ DB of a frequency group (e.g., a frequency group with a first highest priority) to detect a cell for camping.

In some systems, a UE may be configured to scan all frequency bands in an ascending order (e.g., sub-6 GHz/FR1 bands first, followed by mmW frequency bands/frequencies, etc.), which may result in one or more problems. If there are no cells found in the area being scanned during the sub-6 band scan, the UE, based on the ascending order of scanning, may perform a mmW band scan. However, a UE scanning through all mmW frequency bands/frequencies may take a significant amount of time, and if an operative mmW band is at the end of the spectrum and no operative mmW frequency bands/frequencies precede it, the UE may end up wasting significant time scanning all the preceding mmW frequency bands/frequencies before reaching the operative mmW band. This wasted scan time adversely affects the user experience (e.g., a user waiting for a call to be recovered), especially in radio link failure (RLF) recovery or out of service (OOS) recovery. Also, wasted scan time results in battery drain of UE devices.

The present techniques include enhancing standalone acquisition timelines for millimeter wave devices. The present techniques provide a configured order to band scans to avoid wasted scan time. The present techniques include a UE generating and updating a database (e.g., mmW fingerprint database) that correlates sub-6 cells with one or more mmW frequencies/frequency bands. The present techniques include prioritizing mmW frequencies/bands based on the information obtained and stored in the database. In some cases, a UE may receive control signaling (e.g., system information block (SIB)) from a sub-6 cell (e.g., a base station operating in FR1) that indicates neighboring mmW frequency bands/frequencies. In some cases, the UE may identify mmW frequency bands/frequencies based on an acquisition database of previously camped cells. In some cases, the UE may identify mmW frequency bands/frequencies based on one or more scans (e.g., LFS, band scans, OOS scans, RLF scans, public land mobile network (PLMN) scans, etc.). In some cases, the UE may update the database based on the mmW frequency bands/frequencies indicated in the SIB, or based on the mmW frequency bands/frequencies indicated in the acquisition database, or based on the mmW frequency bands/frequencies indicated in the one or more scans, or any combination thereof.

In some cases, the UE may prioritize a first mmW band/frequency over a second mmW band/frequency identified in the SIB, or the acquisition database, or the one or more scans, or any combination thereof. In some cases, the UE may assign a higher priority to mmW frequency bands/frequencies indicated in the SIB than mmW frequency bands/frequencies not indicated in the SIB. In some cases, the UE may assign a higher priority to mmW frequency bands/frequencies indicated in the acquisition database than mmW frequency bands/frequencies not indicated in the acquisition database. In some cases, the UE may assign a higher priority to mmW frequency bands/frequencies indicated in the acquisition database and in the SIB than mmW frequency bands/frequencies identified based on the one or more scans. In some cases, the UE may assign a higher priority to mmW frequency bands/frequencies indicated in the acquisition database than mmW frequency bands/frequencies indicated in the SIB. In some cases, the UE may assign a higher priority to mmW frequency bands/frequencies indicated in the SIB than mmW frequency bands/frequencies indicated in the acquisition database. In some cases, a band/frequency with a higher priority may be scanned before a band/frequency with a lower priority. In some cases, a band/frequency with the higher priority may be scanned while a scan of the band/frequency with the lower priority may be dropped (e.g., not scanned).

Aspects of the subject matter described herein may be implemented to realize one or more advantages. The described techniques support improvements in system efficiency such that a device may decrease power consumption of UEs based on the techniques enabling the UE to avoid prolonged band scans on mmW. Also, the described techniques support faster recovery scans, faster power up scans, decreases in system latency, and increases in system reliability, resulting in improved user experience (e.g., decreased service recovery times).

Aspects of the disclosure are initially described in the context of wireless communications systems. Aspects of the disclosure are further illustrated by and described with reference to scanning sequences, databases, and process flows that relate to enhancing standalone acquisition timelines for millimeter wave devices. Aspects of the disclosure are further illustrated by and described with reference to apparatus diagrams, system diagrams, and flowcharts that relate to enhancing standalone acquisition timelines for millimeter wave devices.

FIG. 1 illustrates an example of a wireless communications system 100 that supports enhancing standalone acquisition timelines for millimeter wave devices in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive control signaling from a base station 105. The control signaling may indicate frequency bands (e.g., one or more frequency bands, or one or more frequencies, or a combination thereof) on which neighbor base stations operate. The neighbor base stations (e.g., one or more other base stations 105) may be associated with the geographic location of base station 105. The UE 115 may perform a frequency scanning procedure based on the control signaling it receives from base station 105. The UE 115 may use at least one frequency band of the one or more frequency bands indicated by the control signaling to select a first neighbor base station of the one or more neighbor base stations. The UE 115 may establish connectivity with the first neighbor base station based on the frequency scanning procedure.

In some cases, the time UE 115 takes to establish connectivity with the first neighbor base station may be reduced based on UE 115 generating and updating a database that correlates base station 105 (e.g., a sub-6 cell) with one or more mmW frequencies/frequency bands (e.g., mmW fingerprint database). In some cases, UE 115 may prioritize mmW frequencies and bands based on the frequencies and bands stored in the database. In some cases, the sub-6 mmW correlations that UE 115 stores in the database may be based on mmW frequency bands/frequencies indicated in a SIB that UE 115 receives from base station 105, or mmW frequency bands/frequencies indicated in an acquisition database, or mmW frequency bands/frequencies UE 115 detects based on one or more scans that UE 115 performs. In some cases, UE 115 may scan one or more mmW frequency bands/frequencies first based on the sub-6 mmW correlations stored in the database. In some cases, UE 115 may avoid scanning one or more mmW frequency bands/frequencies based on the sub-6 mmW correlations stored in the database. Thus, by prioritizing mmW scans, UE 115 may reduce the time UE 115 takes to establish connectivity with the first neighbor base station.

Figure 2:
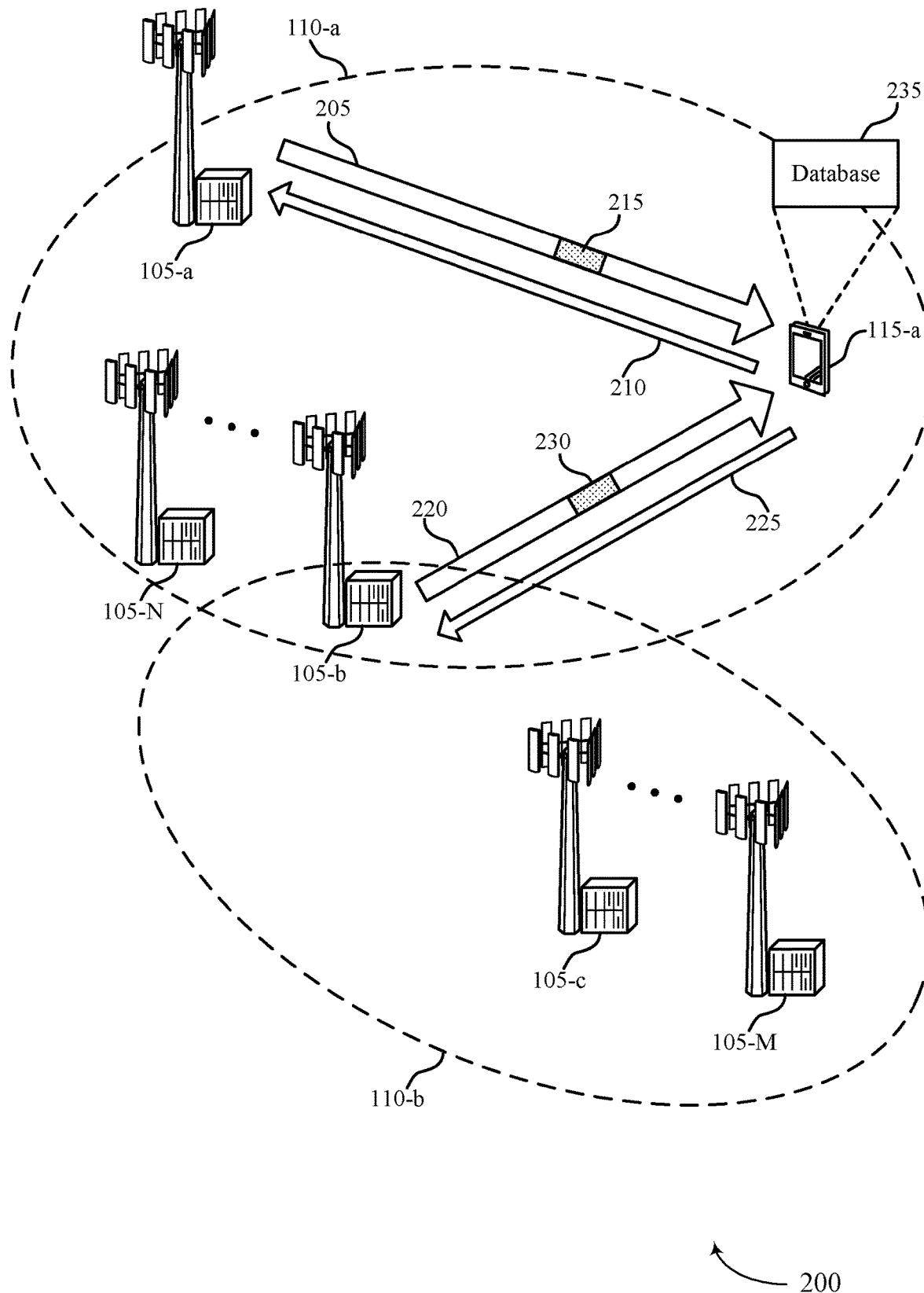
FIG. 2 illustrates an example of a wireless communications system that supports enhancing standalone acquisition timelines for millimeter wave devices in accordance with aspects of the present disclosure.

FIG. 2 illustrates an example of a wireless communications system 200 that supports enhancing standalone acquisition timelines for millimeter wave devices in accordance with aspects of the present disclosure.

As illustrated, wireless communications system 200 may include UE 115-*a* and base station 105-*a*, which may be examples of a UE 115 or a base station 105, as described above with reference to FIG. 1. Wireless communications system 200 may also include one or more first neighbor base stations 105 (e.g., N base stations including base station 105-*b* to base station 105-N) and one or more second neighbor base stations 105 (e.g., M base stations including base station 105-*c* to base station 105-M), which may be examples of base stations 105, as described above with reference to FIG. 1.

In the illustrated example, wireless communications system 200 may also include downlink 205 and uplink 210 between UE 115-*a* and base station 105-*a*, as well as downlink 220 and uplink 225 between UE 115-*a* and base station 105-*b*. Base station 105-*a* may use downlink 205 to convey control and/or data information to UE 115-*a*, and base station 105-*b* may use downlink 220 to convey control and/or data information to UE 115-*a*. Also, UE 115-*a* may use uplink 210 to convey control and/or data information to base station 105-*a*, and UE 115-*a* may use uplink 225 to convey control and/or data information to base station 105-*b*. In some cases, downlink 205 may use different time and/or frequency resources than uplink 210, or downlink 220 may use different time and/or frequency resources than uplink 225, or both. As depicted, base station 105-*a* may be associated with first geographic coverage area 110-*a* in which communications with one or more UEs (e.g., UE 115-*a*) may be supported. In some cases, base station 105-*b* may be associated with first geographic coverage area 110-*a*. As shown, base station 105-*b* may be associated with second geographic coverage area 110-b in which communications with one or more UEs (e.g., UE 115-a) may be supported.

In some examples, UE 115-a may receive control signaling 215 from base station 105-a (e.g., sub-6 cell). In some cases, control signaling 215 may indicate one or more frequency bands on which one or more neighbor base stations (e.g., base station 105-b) operate that are associated with geographic coverage area 110-a of base station 105-a. In some cases, the one or more frequency bands may include one or more millimeter wave frequency bands or one or more millimeter wave frequencies (e.g., individual frequencies), or a combination thereof. In some cases, the frequency scanning procedure may include a cell reselection procedure, or a cell redirection procedure, or a cell handover procedure, or a combination thereof. In some cases, the frequency scanning procedure may include UE 115-a performing multiple scan types, where each scan type includes tuning a receiver antenna (e.g., of multiple receiver antennas) to a given frequency, directing a receive beam of the receiver antenna in some direction, configuring a gain of the receiver antenna, etc. In some cases, the frequency scanning procedure may include UE 115-a performing one or more measurements of one or more signals detected by the receiver antenna.

In some examples, the control signaling 215 may include a system information block (e.g., a SIB message) to indicate the one or more frequency bands on which the one or more neighbor base stations operate that are associated with the geographic coverage area 110-a. It is noted that reference to mmW frequency bands may refer to one or more mmW frequency bands or one or more individual mmW frequencies, or both. It is also noted that reference to mmW frequencies may refer to one or more mmW frequency bands or one or more individual mmW frequencies, or both In some examples, UE 115-a may perform a frequency scanning procedure based on the control signaling 215. In some cases, UE 115-a may use at least one frequency band of the one or more frequency bands indicated in control signaling 215 to select base station 105-b of the one or more neighbor base stations. In some cases, UE 115-a may establish connectivity with the base station 105-b based on the frequency scanning procedure. In some cases, UE 115-a may select base station 105-b establish connectivity with the base station 105-b based on the selection. In some cases, UE 115-a may select base station 105-b based on UE 115-a measuring multiple bands and selecting the highest measured signaling strength after measuring the multiple bands. In some cases, UE 115-a may select base station 105-b based on one or more measurements that UE 115-a performs in relation to base station 105-b and at least one other base station of the N base stations. In some cases, UE 115-a may select base station 105-b based on a signal strength threshold. In some cases, UE 115-a may select base station 105-b based on UE 115-a selecting a band (e.g., of base station 105-b) in which UE 115-a measures a signal strength that satisfies a threshold.

In some examples, UE 115-a may receive control signaling 230 from base station 105-b based on the established connectivity with the base station 105-b. In some cases, control signaling 230 may include a second system information block indicating one or more second frequency bands on which one or more second neighbor base stations (e.g., base station 105-c) operate that are associated with second geographic coverage area 110-b.

In some cases, UE 115-a may perform, based on the control signaling 230, a second frequency scanning procedure using at least one frequency band of the one or more second frequency bands indicated by control signaling 230 to select base station 105-c of the one or more second neighbor base stations. In some cases, UE 115-a may perform the second frequency scanning procedure to identify one or more additional frequency bands in addition to the one or more frequency bands indicated via the control signaling 215. In some cases, UE 115-a may establish connectivity with base station 105-c operating using a second frequency band of the one or more second frequency bands.

In some cases, UE 115-a may identify one or more additional frequency bands based on querying an acquisition database. The one or more additional frequency bands may be other than the one or more frequency bands indicated via the control signaling 215 and the one or more second frequency bands indicated by control signaling 230. The one or more additional frequency bands may indicate one or more base stations with which UE 115-a previously established connectivity (e.g., corresponding to the geographic coverage area 110-a). In some cases, the frequency scanning procedure may be performed using at least one frequency band of the one or more additional frequency bands.

In some cases, UE 115-a may store, in a database 235, a link between the one or more frequency bands indicated in control signaling 215 and the geographic coverage area 110-a. In some cases, UE 115-a may store, in database 235, a link between the one or more second frequency bands indicated in control signaling 230 and the geographic coverage area 110-b. In some cases, UE 115-a may store, in database 235, a link between the one or more additional frequency bands based on querying the acquisition database and the geographic coverage area 110-a.

In some cases, UE 115-a may associate a new radio cell global identifier (NCGI) of base station 105-a with the geographic coverage area 110-a of base station 105-a. In some cases, the update may include associating an NCGI of a base station (e.g., base station 105-a, base station 105-b) with one or more frequency bands (e.g., mmW frequency bands) stored in database 235. In some cases, an NCGI may include a global cell identity that is based on a public land mobile network (PLMN) and a system information block type 1 (SIB1).

In some examples, UE 115-a may fingerprint the mmW bands and the one or more absolute radio frequency channel numbers (ARFCNs) available in a geographic area based on the sub-6 NCGI (e.g., PLMN+SIB1 global cell identity) present in that area. When UE 115-a discovers a sub-6 cell in an area, the UE 115-a determines which mmW bands and frequencies to prioritize based on an assumption that since mmW cells do not have a long range, mmW cells will likely be augmented by a sub-6 5G cell in the general vicinity. Additionally, since mmW cells may not have a long range, mmW cells may be augmented by a sub-6 cell at that same geographic location. If no sub-6 cells are found, then the UE 115-a may skip performing a mmW band scan. In some cases, UE 115-a attempts to map each mmW cell that is found around one or more sub-6 cells in a given area. When a UE 115-a discovers a sub-6 cell, UE 115-a may determine mmW deployment around that sub-6 cell, store the mmW deployment in database 235, and prioritize a scan order to find those mmW cells in that particular area faster than if no scan order prioritization were performed.

In some examples, UE 115-a performing the frequency scanning procedure may include UE 115-a prioritizing one or more frequency bands stored in database 235. In some cases, UE 115-a may prioritize a first frequency band stored in database 235 over a second frequency band stored in database 235. In some cases, UE 115-a may prioritize a frequency band stored in database 235 over a frequency band not stored in database 235. In some cases, may prioritize a frequency band included in the acquisition database (e.g., stored in database 235) over a frequency band not included in the acquisition database.

In some cases, UE 115-a may perform the frequency scanning procedure over a set of frequency bands in a prioritized order indicated in a list of database 235, or that indicates to prioritize scanning bands in frequency range one, or that indicates to prioritize scanning of one or more millimeter wave frequencies associated with the one or more neighbor base stations, or that indicates to prioritize scanning of one or more additional millimeter wave frequencies identified during a prior frequency scanning procedure associated with the geographic coverage area 110-a, or a combination thereof.

In some cases, UE 115-a performing the frequency scanning procedure may include UE 115-a prioritizing scanning of at least one millimeter wave frequency of the one or more millimeter wave frequencies corresponding to base station 105-a over a second frequency band. In some cases, UE 115-a performing the frequency scanning procedure may include UE 115-a scanning a millimeter wave operating frequency associated with a loss of service. In some cases, UE 115-a performing the frequency scanning procedure may include UE 115-a identifying one or more secondary cell group cells corresponding to a dual connectivity mode, mapping the one or more secondary cell group cells to one or more primary cells, and adding the mapping and the one or more secondary cell group cells to the database 235. In some cases, UE 115-a performing the frequency scanning procedure may include UE 115-a prioritizing scanning one or more millimeter wave frequencies of the one or more frequency bands indicated in the control signaling 215. In some cases, UE 115-a performing the frequency scanning procedure may include UE 115-a prioritizing scanning one or more millimeter wave frequencies of the one or more frequency bands indicated in the control signaling 230.

The present techniques may reduce power consumption and free up processing cycles of one or more devices (e.g., battery-operated devices, a UE 115 of FIG. 1, etc.) by avoiding prolonged band scans on millimeter wave frequencies, thus improving user experience of the one or more devices with longer battery life and improved quality of service. In some cases, one or more devices (e.g., base station 105-a, base station 105-b, base station 105-c, a network device, a network router, a network gateway, etc.) responsible for supporting, managing, and providing control signaling to indicate frequency bands on which one or more neighbor base stations operate that are associated with a geographic coverage area (e.g., geographic coverage area 110-a, geographic coverage area 110-b).

FIG. 3 illustrates an example of a database 300 that supports enhancing standalone acquisition timelines for millimeter wave devices in accordance with aspects of the present disclosure.

In some examples, database 300 may include multiple database entries. In some cases, database 300 may include entries that fingerprint one or more mmW frequency bands or one or more mmW frequencies, or a combination thereof. In some cases, database 300 may link the mmW frequency bands/frequencies to one or more geographic areas (e.g., geographic coverage area 110-a, geographic coverage area 110-b). In some cases, database 300 may link the mmW frequency bands/frequencies to one or more base stations that are associated with the one or more geographic areas. In some cases, linking a first entry of the database 300 (e.g., an entry of a frequency band/frequency) to a second entry of the database 300 (e.g., an entry of a geographic area or a base station associated with the geographic area) may include associating the first entry with the second entry. In some cases, associating the first entry with the second entry may include generating a pointer that points the first entry to the second entry. In some cases, the database 300 may relate the first entry to the second entry based on a unique identifier common to the first entry and the second entry. In some cases, each entry of a given row or a given column may be linked to each other.

In the illustrated example, database 300 may include entry 305, entry 310, entry 315, up to entry 320. In some cases, the database 300 may be referred to as a fingerprint database (e.g., fingerprints mmW frequency bands/frequencies that are associated with one or more geographic areas). As shown, entry 305 may include "NCGI 1," which may refer to the new radio cell global identifier (NCGI) of a first base station (e.g., a sub-6 base station). As shown, entry 305 may also include "n257/SCS120," which may refer to mmW node 257 that operates with a sub-carrier spacing (SCS) of 120 kHz that is linked to the NCGI 1 base station. Entry 305 may also include "n260/SCS240," which may refer to mmW node 260 that operates with an SCS of 240 kHz that is linked to the NCGI 1 base station. As shown, entry 305 may also include "2054683," which refers to an individual frequency that is linked to the NCGI 1 base station. Similarly, entry 310 may include NCGI 2 of a second base station (e.g., a sub-6 base station), as well as mmW node "n261/SCS120" and frequency "2071387" that are linked to the NCGI 2 base station. As shown, entry 315 may include "LTE CGI," an identifier of an LTE base station that is linked to a frequency "2054683" in database 300. As shown, entry 320 may include "NCGI 3," an identifier of a third base station (e.g., a sub-6 base station), that is linked to frequency "2016955," mmW node "n257/SCS240" and mmW node "n258/SCS240."

In some examples, database 300 may fingerprint or identify millimeter wave (mmW) frequency bands associated with a geographic location (e.g., a geographic location of base station NCGI 1, first geographic coverage area 110-a, second geographic coverage area 110-b etc.). In some cases, the mmW frequency bands/frequencies of database 300 may include one or more mmW frequency bands or one or more mmW frequencies, or a combination thereof. In some cases, the mmW frequency bands/frequencies of database 300 may include mmW frequency bands/frequencies indicated in control signaling (e.g., one or more SIB messages) from a base station. In some cases, the mmW frequency bands/frequencies of database 300 may include mmW frequency bands/frequencies indicated in an acquisition database of previously camped cells. In some cases, the mmW frequency bands/frequencies of database 300 may include mmW frequency bands/frequencies identified in one or more scans (e.g., LFS scans, band scans, OOS scans, RLF scans, PLMN scans, etc.). In some cases, a first set of one or more mmW frequency bands/frequencies of database 300 may be prioritized over a second set of one or more mmW frequency bands/frequencies of database 300. In some cases, a first set of one or more mmW frequency bands/frequencies of database 300 may be prioritized over one or more mmW frequency bands/frequencies not included in database 300.

In some examples, a UE (e.g., UE 115 of FIG. 1 or FIG. 2) may update database 300 based on information the UE receives (e.g., from a base station) or information the UE determines (e.g., based on one or more scans), or both. In some cases, the UE may receive from a base station a SIB message that indicates neighboring mmW frequency bands/ frequencies associated with the geographic location of the base station. In some cases, when the UE discovers the base station (e.g., via a scan, via an acquisition database, etc.), the UE may assume that one or more mmW frequency bands/ frequencies are present in the area where that base station is discovered.

In some examples, whenever a UE camps on a cell (e.g., of a base station), the UE may update database 300 to link the one or more NCGIs of the cell to the mmW frequency bands/frequencies in that geographic area. In some cases, the UE may identify one or more mmW frequency bands/ frequencies based on a PLMN scan (e.g., management PLMN scan) and link the identified mmW frequency bands/ frequencies to a geographic location associated with the PLMN scan.

In some cases, some networks (e.g., base stations) may not support the SIB that indicates mmW frequency bands/ frequencies to the UE. When a network does not support the mmW SIB message, the UE may assume that the database 300 does not include any cells (e.g., no NCGI entries). During one or more initial scans (e.g., LFS, OOS, RLF, PLMN scans on sub-6 and mmW cells), the UE may identify one or more sub-6 cells or mmW cells, or both. In some cases, the UE may determine that the identified sub-6 cells or mmW cells are not suitable. In some cases, a suitability of a cell (e.g., sub-6 or mmW) may be based on a telemetry of a cell (e.g., whether the telemetry satisfies a telemetry threshold), or based on a configuration of a mmW node (e.g., compatibility of a cell configuration to a UE configuration), or based on a power level or signal quality associated with the cell (e.g., whether power level or signal quality satisfies a signal threshold), or a combination thereof.

After the UE identifies the one or more sub-6 and mmW cells, the UE may fingerprint those found sub-6 cells with the found mmW cells (e.g., link the found mmW cells to the found sub-6 cells and record the linked cells in database 300 corresponding to a current geographic location of the UE). In some cases, the UE may identify and link the found sub-6 cells and found mmW cells based on one or more inter-frequency processes (e.g., reselection, redirection, handover). In some cases, the UE may receive information from a sub-6 cell (e.g., base station, sub-6 NCGI in database 300) regarding mmW neighbor frequencies in NR cells. Thus, the UE may identify one or more sub-6/mmW cells based on the one or more scans, or information (e.g., SIB message from the camped sub-6 NCGI) received from a sub-6 cell. The UE may update database 300 based on the identified one or more sub-6/mmW cells. The UE may update the database 300 by storing a link in the database between the frequency band, the cell, and the geographic location, such that the UE may know which frequency band(s) to scan when at or near that geographic location.

In some cases, a UE may operate in a dual connectivity mode (e.g., multiple receive/multiple transmit) to utilize radio resources of two distinct schedulers of a master base station and a secondary base station, respectively, which may be connected via a backhaul link (e.g., backhaul links 120, X2, Xn, or other interface). A first group of cells associated with the master base station (e.g., first radio access network) may be referred to a master cell group (MCG), while a second group of cells associated with the secondary base station (e.g., second radio access network) may be referred to as a secondary cell group (SCG). In some cases, the UE may initiate a band scan (e.g., sub-6 band scan, mmW band scan) based on the entries the UE adds to database 300. In some cases, mmW cells of an SCG may be added to database 300. When SCG mmW cells are added in an evolved universal terrestrial radio access (E-UTRA) NR dual connectivity (ENDC) or NR dual connectivity (NRDC) mode of operation, the UE may relate or map those SCG mmW cells to LTE/NR primary cells (Pcells).

Figure 4:
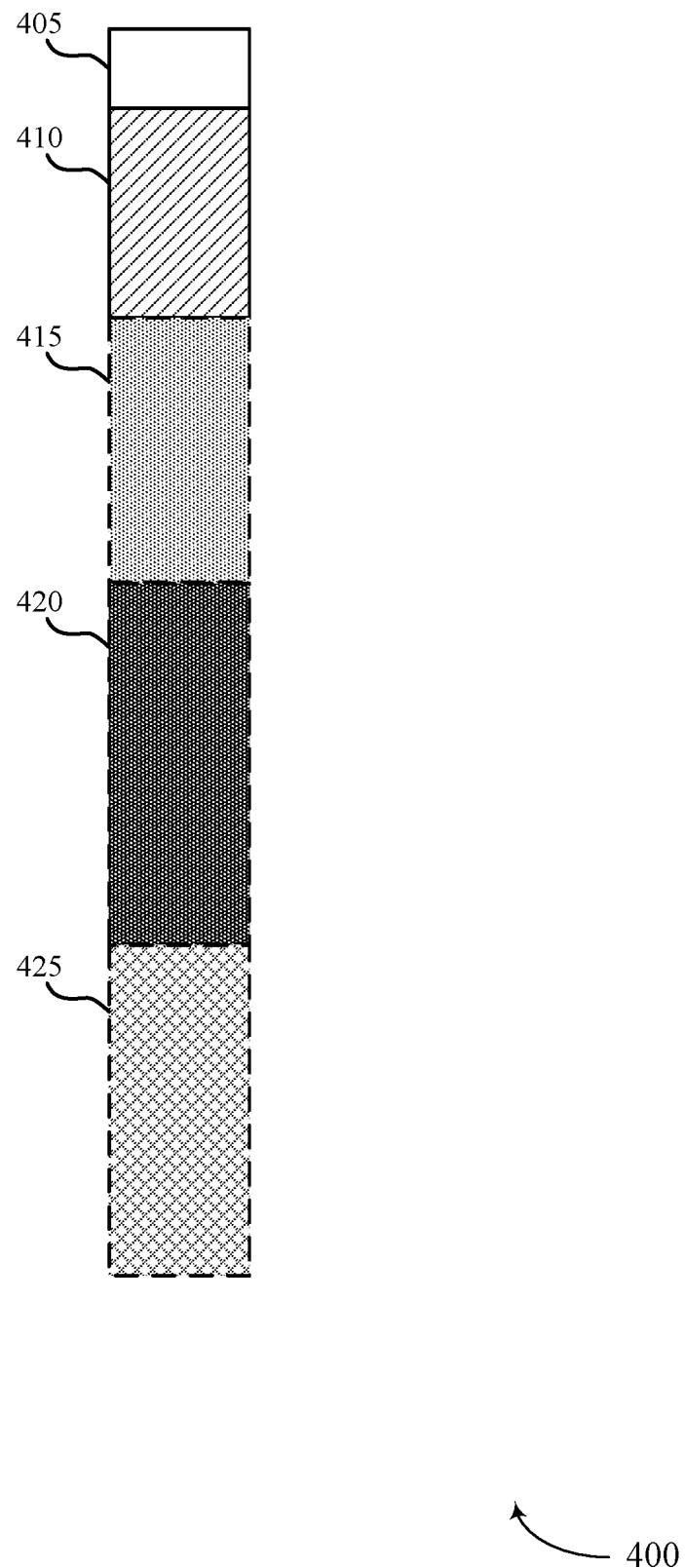
FIG. 4 illustrates an example of a database that supports enhancing standalone acquisition timelines for millimeter wave devices in accordance with aspects of the present disclosure.

FIG. 4 illustrates an example of a scanning sequence 400 that supports enhancing standalone acquisition timelines for millimeter wave devices in accordance with aspects of the present disclosure. It is noted that reference throughout to mmW frequency bands may refer to one or more mmW frequency bands or one or more individual mmW frequencies, or both. It is also noted that reference throughout to mmW frequencies may refer to one or more mmW frequency bands or one or more individual mmW frequencies, or both.

In some cases, scanning sequence 400 may be based on a frequency scanning procedure. In some cases, the frequency scanning procedure may include a UE performing a set of different scan types, where a database (e.g., database 300) indicates which one or more bands for the UE to scan for each scan type (e.g., which bands to scan of an acquisition database, which sub-6 bands to scan, which mmW bands to scan, etc.).

In the illustrated example, scanning sequence 400 may include scan type 405 (e.g., one or more mmW frequency bands or one or more individual mmW frequencies, or both) listed in an acquisition database and one or more mmW cells listed in a fingerprint database (e.g., database 235 of FIG. 2) of prioritized mmW cells, scan type 410 may be associated with frequency range one (e.g., operating frequencies of sub-6 cells), scan type 415 may be associated with mmW frequencies stored in the fingerprint database that the UE determines are unsuitable or associated with a sub-6 cell the UE determines is unsuitable (e.g., based on telemetry, configuration etc.), scan type 420 may be associated with frequencies of other radio access technologies, and scan type 425 may be associated with remaining mmW frequencies (e.g., mmW frequencies not in acquisition database, mmW frequencies not in database 235, mmW frequencies not indicated in a SIB from a base station, etc.). In some cases, scan type 420 of other radio access technologies may include long term evolution (LTE) frequencies (e.g., 700 MHz to 2700 MHz), or global System for mobile communications (GSM), or code-division multiple access (CDMA), or wideband CMDA, or universal mobile telecommunications system (UMTS), or Wi-Fi frequencies, or near-field frequencies (e.g., BLUETOOTH®), or a combination thereof.

In some examples, scanning sequence 400 depicts a chronological sequence of scan types that a UE may perform in association with a frequency scanning procedure. In some cases, the frequency scanning procedure may include a UE scanning frequencies of scan type 405, then scanning frequencies of scan type 410. After scanning frequencies of scan type 405 and frequencies of scan type 410, the UE may optionally scan frequencies associated with scan type 415, or optionally scan frequencies associated with scan type 420, or optionally scan frequencies associated with scan type 425, or optionally scan some combination thereof. When the UE determines that a database fingerprinting related mmW cell (e.g., database 235) is available, the UE may be configured to camp on a best available cell as quickly as the UE is able to do so. Determining the best available cell may be based on the UE scanning frequencies of scan type 405, then scanning frequencies of scan type 410, optionally scanning frequencies associated with scan type 415, optionally scanning frequencies associated with scan type 420, and optionally scanning scan frequencies associated with scan type 425. Determining the best available cell may include the UE deprioritizing mmW frequency bands/frequencies by configuring the UE a best chance to find mmW cells based on the database fingerprinting related mmW cells. In some cases, the UE might skip at least a portion of a mmW band scan (e.g., when no sub-6 cells are found). In some cases, the UE may perform a mmW band scan when the UE determines there is a certain degree of certainty (e.g., greater than 50%, etc.) that mmW cells will be found based on the UE performing a mmW band scan in that area.

In some cases, the frequency scanning procedure may include the UE determining sub-6 cells or mmW frequencies associated with sub-6 cells, or both, that are associated with an acquisition database of previously camped cells. Scan type 405 may include at least a portion of the determined sub-6 cells/mmW frequencies based on the UE querying the acquisition database. In some cases, the UE may perform a band scan of known sub-6 cells included in scan type 410 (e.g., one or more sub-6 cells stored in acquisition database).

In some examples, the UE may store links between entries of mmW frequencies and entries of sub-6 cells in a database (e.g., database 235). In some cases, scan type 415 may include the mmW frequencies linked to the sub-6 cells stored in the database. In some cases, the sub-6 cells stored in the database may correlate to sub-6 cells stored in the acquisition database (e.g., previously camped cells). In some cases, the sub-6 cells stored in the database may correlate to a sub-6 cell on which the UE is currently camped. In some cases, the UE may optionally perform a band scan of mmW frequencies stored in the database. In some cases, the UE may perform the optional band scan of the mmW frequencies stored in the database (e.g., mmW frequencies of scan type 415) after performing the band scan of known sub-6 cells included in scan type 410.

In some examples, scan type 420 may include the frequencies (e.g., one or more frequency bands or one or more frequencies, or both) associated with other radio access technologies (e.g., LTE, GSM, CDMA, wideband CMDA, UMTS, Wi-Fi, near-field, etc.). In some cases, the UE may optionally perform a band scan of frequencies associated with the other radio access technologies. In some cases, the UE may perform the optional band scan of the other radio access technologies (e.g., frequencies of scan type 420) after performing the band scan of known sub-6 cells included in scan type 410, or after performing the band scan of known sub-6 cells included in scan type 410 and then performing the optional band scan of the mmW frequencies included in scan type 415.

In some examples, scan type 425 may include the frequencies (e.g., one or more frequency bands or one or more frequencies, or both) associated with remaining mmW frequencies (e.g., mmW frequencies not in acquisition database, mmW frequencies not in database 235, mmW frequencies not indicated in a SIB from a base station, etc.). In some cases, the UE may optionally perform a band scan of frequencies associated with the remaining mmW frequencies. In some cases, the UE may perform the optional band scan of the remaining mmW frequencies (e.g., frequencies of scan type 425) after performing the band scan of known sub-6 cells included in scan type 410, or after performing the band scan of known sub-6 cells included in scan type 410 and then performing the optional band scan of the mmW frequencies included in scan type 415, or after performing the band scan of known sub-6 cells included in scan type 410 and then performing the optional band scan of the other radio access technologies included in scan type 420, or after performing the band scan of known sub-6 cells included in scan type 410, then performing the optional band scan of the mmW frequencies included in scan type 415, and then performing the optional band scan of the other radio access technologies included in scan type 420. Based on the scans the UE selects to perform and the scans the UE selects not to perform, the UE may avoid wasted scan time, resulting in an increase in the battery life and quality of service of the UE.

In some examples, when the UE determines that a database fingerprinting related mmW cells (e.g., database 235) is not available or not generated, the UE may be configured to camp on a cell as quickly as the UE is able to do so. In some cases, the UE may perform a legacy scan of the acquisition database followed by a band scan, but prioritize sub-6 bands (e.g., prioritize only sub-6 bands). In some cases, the UE may scan mmW frequency bands/frequencies after sub-6 scans or not at all.

When loss of service occurs while the UE is connected to a mmW cell, then the UE may attempt to scan the mmW frequency bands/frequencies associated with that mmW cell at the end of the sub-6 band scan (e.g., before scanning other mmW frequency bands/frequencies if other mmW frequency bands/frequencies are scanned). When the UE does not identify any sub-6 cells in a given area (e.g., suitable or unsuitable sub-6 cells), the UE may skip or drop mmW scans (e.g., mmW band scan) because it may be assumed that sub-6 cells are deployed to augment mmW coverage (e.g., if no sub-6 cells in an area, then likely there are no mmW cells). Accordingly, the UE is configured to avoid mmW band scans that are unlikely to result in the discovery of mmW cells. In some examples, when a UE queries an acquisition database or performs a band scan, or both, and as a result discovers sub-6 cells A and B are associated with mmW frequency bands n260/n261, the UE may scan n260/261 before other mmW frequencies (e.g., based on UE band preference). In some examples, during LFS the UE may discover sub-6 frequency A. In some cases, the UE may determine that sub-6 frequency A is unsuitable (e.g., based on telemetry, configuration etc.). Accordingly, the UE may discover mmW frequency B (e.g., based on acquisition database, based on a SIB, based on a mmW scan, etc.) and link NCGI A of sub-6 frequency A with mmW frequency B. The UE may store this link in a mmW fingerprint database (e.g., database 235, database 300). In some cases, the UE may scan mmW frequency B after scanning sub-6 frequency A.

In some examples, at some first time period the UE may identify sub-6 frequency A and determine that mmW frequency B is within some vicinity of sub-6 frequency A. Accordingly the UE may store a link between sub-6 frequency A (e.g., the NCGI sub-6 frequency A) and mmW frequency B in a mmW fingerprint database. In some cases, at a second time period after the first time period, the UE may find sub-6 frequency A based on a scan (e.g., based on a list frequency scan). In some cases, the UE may determine that sub-6 frequency A is unsuitable. However, the UE may determine that the mmW fingerprint database links the NCGI of sub-6 frequency A to mmW frequency B. Based on the link between the NCGI of sub-6 frequency A and mmW frequency B in the mmW fingerprint database, the UE may scan mmW frequency B after scanning and finding sub-6 frequency A. In some cases, the UE may scan mmW frequency B before other mmW frequencies.

Figure 5:
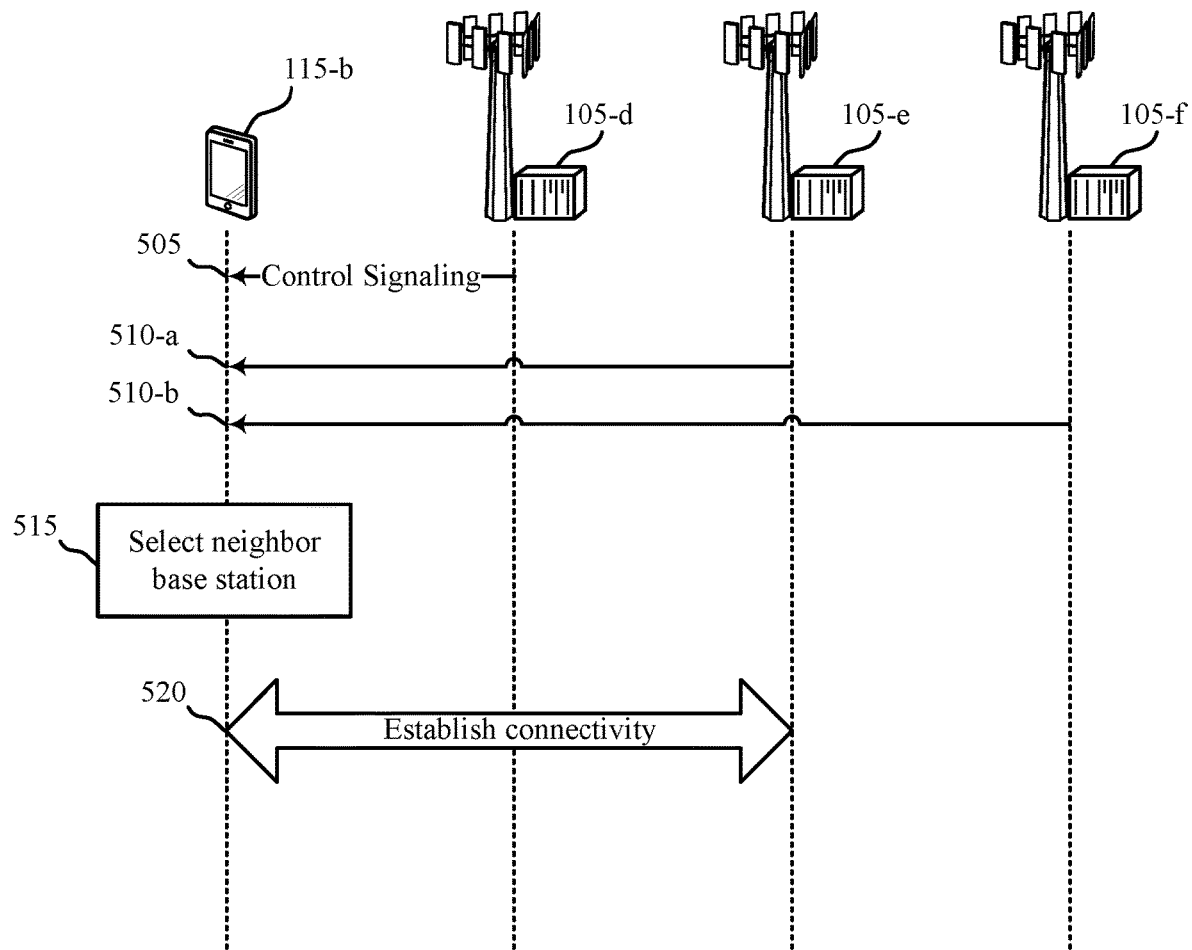
FIG. 5 illustrates an example of a process flow that supports enhancing standalone acquisition timelines for millimeter wave devices in accordance with aspects of the present disclosure.

FIG. 5 shows a process flow 600 that supports enhancing standalone acquisition timelines for millimeter wave devices in accordance with aspects of the present disclosure.

At 605, base station 105-d (e.g., serving base station) transmits control signaling to UE 115-b. In some cases, the control signaling may indicate one or more frequency bands on which one or more neighbor base stations (e.g., base station 105-e, base station 105-f) operate that are associated with a geographic location of base station 105-d. In some cases, the control signaling may include a system information block that indicates the one or more frequency bands on which the one or more neighbor base stations operate that are associated with the geographic location.

At 610, UE 115-b may perform a frequency scanning procedure. In some cases, the frequency scanning procedure may be based on the control signaling UE 115-b receives from base station 105-d. In some cases, the frequency scanning procedure may include the UE 115-b performing various scan types of frequencies indicated in a mmW fingerprint database (e.g., database 235, database 300). As shown, the frequency scanning procedure may include UE 115-b measuring a signal of base station 105-e at 510-a and UE 115-b measuring a signal of base station 105-f at 510-b based on the various scan types of frequencies indicated in the mmW fingerprint database.

At 615, UE 115-b may select a neighbor base station (e.g., base station 105-e or base station 105-f). In some cases, UE 115-b may use at least one frequency of the mmW fingerprint database to select the neighbor base station and establish connectivity with the selected neighbor base station.

At 620, UE 115-b may establish connectivity with base station 105-e based on UE 115-b selecting base station 105-e as the selected neighbor base station. In some cases, UE 115-b may establish connectivity with base station 105-e based on the frequency scanning procedure.

Figure 6:
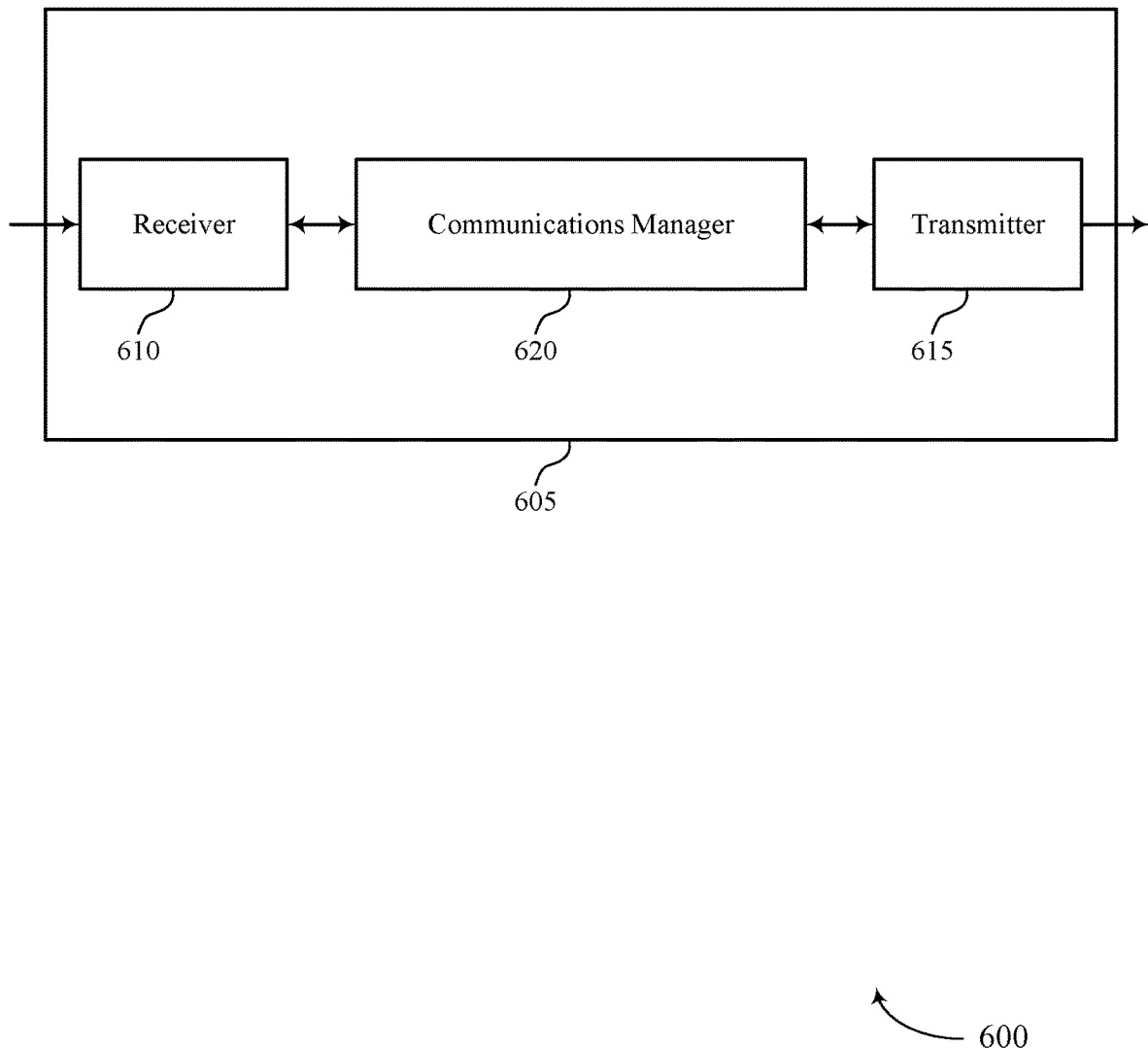
FIGS. 6 and 7 show block diagrams of devices that support enhancing standalone acquisition timelines for millimeter wave devices in accordance with aspects of the present disclosure.

FIG. 6 shows a block diagram 600 of a device 605 that supports enhancing standalone acquisition timelines for millimeter wave devices in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhancing standalone acquisition timelines for millimeter wave devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhancing standalone acquisition timelines for millimeter wave devices). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of enhancing standalone acquisition timelines for millimeter wave devices as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a first base station, control signaling indicating one or more frequency bands on which one or more neighbor base stations operate that are associated with a first geographic location of the first base station. The communications manager 620 may be configured as or otherwise support a means for performing, based on the control signaling, a frequency scanning procedure using at least one frequency band of the one or more frequency bands to select a first neighbor base station of the one or more neighbor base stations. The communications manager 620 may be configured as or otherwise support a means for establishing connectivity with the first neighbor base station based on the frequency scanning procedure.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for increasing system efficiency and decreasing power consumption of UEs based on the techniques described herein that enable the UE to avoid prolonged band scans on mmW. The described techniques provide reduced processing, reduced power consumption, more efficient utilization of communication resources, resulting in improved user experience (e.g., decreased service recovery times).

Figure 7:
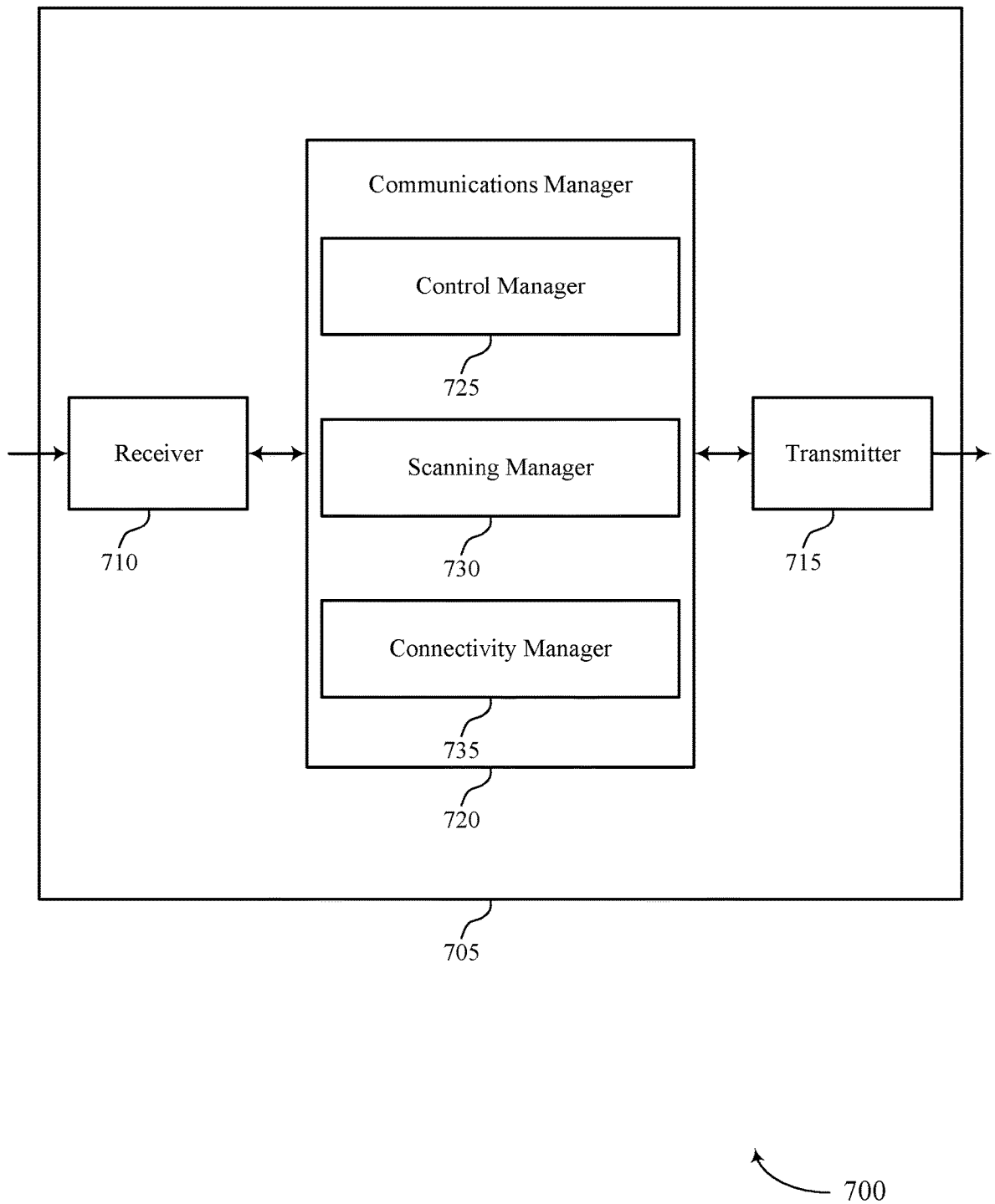

FIG. 7 shows a block diagram 700 of a device 705 that supports enhancing standalone acquisition timelines for millimeter wave devices in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to enhancing standalone acquisition timelines for millimeter wave devices). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to enhancing standalone acquisition timelines for millimeter wave devices). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of enhancing standalone acquisition timelines for millimeter wave devices as described herein. For example, the communications manager 720 may include a control manager 725, a scanning manager 730, a connectivity manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The control manager 725 may be configured as or otherwise support a means for receiving, from a first base station, control signaling indicating one or more frequency bands on which one or more neighbor base stations operate that are associated with a first geographic location of the first base station. The scanning manager 730 may be configured as or otherwise support a means for performing, based on the control signaling, a frequency scanning procedure using at least one frequency band of the one or more frequency bands to select a first neighbor base station of the one or more neighbor base stations. The connectivity manager 735 may be configured as or otherwise support a means for establishing connectivity with the first neighbor base station based on the frequency scanning procedure.

Figure 8:
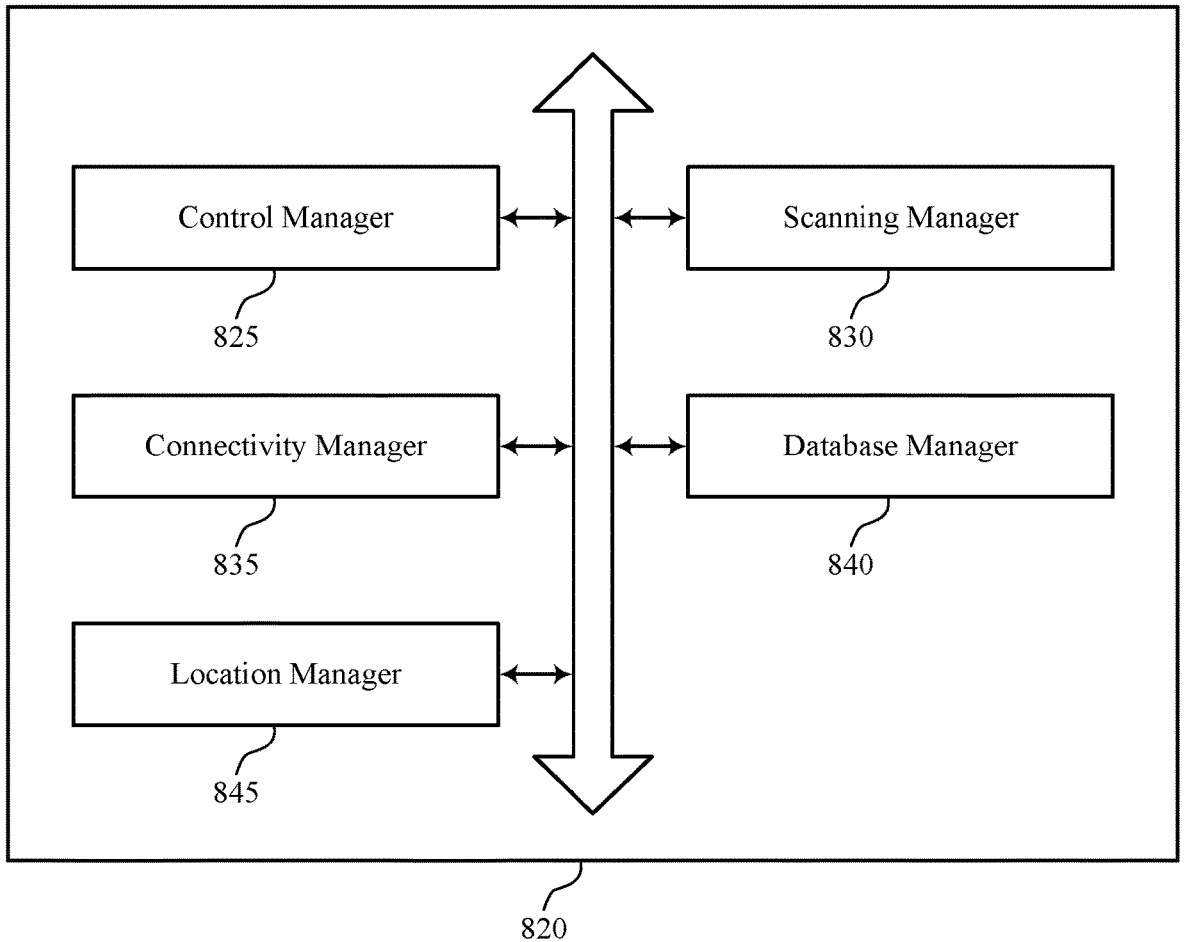
FIG. 8 shows a block diagram of a communications manager that supports enhancing standalone acquisition timelines for millimeter wave devices in accordance with aspects of the present disclosure.

FIG. 8 shows a block diagram 800 of a communications manager 820 that supports enhancing standalone acquisition timelines for millimeter wave devices in accordance with aspects of the present disclosure. The communications manager 820 may be an example of aspects of a communications manager 620, a communications manager 720, or both, as described herein. The communications manager 820, or various components thereof, may be an example of means for performing various aspects of enhancing standalone acquisition timelines for millimeter wave devices as described herein. For example, the communications manager 820 may include a control manager 825, a scanning manager 830, a connectivity manager 835, a database manager 840, a location manager 845, or any combination thereof. Each of these components may communicate, directly or indirectly, with one another (e.g., via one or more buses).

The communications manager 820 may support wireless communication at a UE in accordance with examples as disclosed herein. The control manager 825 may be configured as or otherwise support a means for receiving, from a first base station, control signaling indicating one or more frequency bands on which one or more neighbor base stations operate that are associated with a first geographic location of the first base station. The scanning manager 830 may be configured as or otherwise support a means for performing, based on the control signaling, a frequency scanning procedure using at least one frequency band of the one or more frequency bands to select a first neighbor base station of the one or more neighbor base stations. The connectivity manager 835 may be configured as or otherwise support a means for establishing connectivity with the first neighbor base station based on the frequency scanning procedure.

In some examples, to support receiving the control signaling, the control manager 825 may be configured as or otherwise support a means for receiving the control signaling including a system information block indicating the one or more frequency bands on which the one or more neighbor base stations operate that are associated with the first geographic location.

In some examples, the control manager 825 may be configured as or otherwise support a means for receiving, from the first neighbor base station, second control signaling including a second system information block indicating one or more second frequency bands on which one or more second neighbor base stations operate that are associated with a second geographic location.

In some examples, the control manager 825 may be configured as or otherwise support a means for performing, based on the second control signaling, a second frequency scanning procedure using at least one frequency band of the one or more second frequency bands to select a second neighbor base station of the one or more second neighbor base stations. In some examples, the control manager 825 may be configured as or otherwise support a means for establishing connectivity with the second neighbor base station operating using a second frequency band of the one or more second frequency bands.

In some examples, to support performing the frequency scanning procedure, the scanning manager 830 may be configured as or otherwise support a means for performing the frequency scanning procedure to identify one or more additional frequency bands other than the one or more frequency bands indicated via the control signaling.

In some examples, the database manager 840 may be configured as or otherwise support a means for storing, in a database, a link between the one or more frequency bands and the first geographic location. In some examples, the database manager 840 may be configured as or otherwise support a means for updating a database to associate the one or more frequency bands with the first geographic location. In some examples, the updating includes associating a new radio cell global identifier of the first neighbor base station with the first frequency band.

In some examples, the scanning manager 830 may be configured as or otherwise support a means for identifying one or more additional frequency bands other than the one or more frequency bands indicated via the control signaling based on querying an acquisition database indicating one or more base stations with which the UE previously established connectivity corresponding to the first geographic location, where the frequency scanning procedure is performed using at least one frequency band of the one or more additional frequency bands.

In some examples, the scanning manager 830 may be configured as or otherwise support a means for performing the frequency scanning procedure that prioritizes at least one operating frequency of the one or more additional frequency bands over a second frequency band based on the at least one operating frequency being in the acquisition database and the second frequency band not being included in the acquisition database.

In some examples, to support performing the frequency scanning procedure, the scanning manager 830 may be configured as or otherwise support a means for performing a scan to identify one or more cells. In some examples, to support performing the frequency scanning procedure, the scanning manager 830 may be configured as or otherwise support a means for performing a band scan of one or more millimeter wave bands associated with the identified one or more cells, where the selecting of the first neighbor base station is based on the performing the band scan of the one or more millimeter wave bands.

In some examples, to support performing the frequency scanning procedure, the scanning manager 830 may be configured as or otherwise support a means for performing a scan of one or more millimeter wave frequency bands that are not associated with the control signaling or a scan of one or more millimeter wave bands associated with identified cells, where the selecting of the first neighbor base station is based on the performing the scan of the one or more millimeter wave frequency bands.

In some examples, to support performing the frequency scanning procedure, the scanning manager 830 may be configured as or otherwise support a means for performing the frequency scanning procedure over a set of frequency bands in a prioritized order indicated in a list, or that indicates to prioritize scanning bands in frequency range one, or that indicates to prioritize scanning of one or more millimeter wave frequencies associated with the one or more neighbor base stations, or that indicates to prioritize scanning of one or more additional millimeter wave frequencies identified during a prior frequency scanning procedure associated with the first geographic location, or a combination thereof.

In some examples, to support performing the frequency scanning procedure, the scanning manager 830 may be configured as or otherwise support a means for performing the frequency scanning procedure that prioritizes scanning of at least one millimeter wave frequency of the one or more millimeter wave frequencies corresponding to the first base station over a second frequency band.

In some examples, to support performing the frequency scanning procedure, the scanning manager 830 may be configured as or otherwise support a means for scanning a millimeter wave operating frequency associated with a loss of service.

In some examples, to support performing the frequency scanning procedure, the scanning manager 830 may be configured as or otherwise support a means for identifying one or more secondary cell group cells corresponding to a dual connectivity mode. In some examples, to support performing the frequency scanning procedure, the scanning manager 830 may be configured as or otherwise support a means for mapping the one or more secondary cell group cells to one or more primary cells. In some examples, to support performing the frequency scanning procedure, the scanning manager 830 may be configured as or otherwise support a means for adding the mapping and the one or more secondary cell group cells to a database.

In some examples, to support performing the frequency scanning procedure, the scanning manager 830 may be configured as or otherwise support a means for performing the frequency scanning procedure that prioritizes scanning one or more millimeter wave frequencies of the one or more frequency bands indicated in the control signaling.

In some examples, the one or more frequency bands includes one or more millimeter wave frequency bands or one or more millimeter wave frequencies, or a combination thereof. In some examples, the frequency scanning procedure includes a cell reselection procedure, or a cell redirection procedure, or a cell handover procedure, or a combination thereof.

In some examples, the location manager 845 may be configured as or otherwise support a means for associating a new radio cell global identifier of the first base station with the first geographic location of the first base station. In some examples, the new radio cell global identifier includes a global cell identity based on a public land mobile network and a system information block type.

Figure 9:
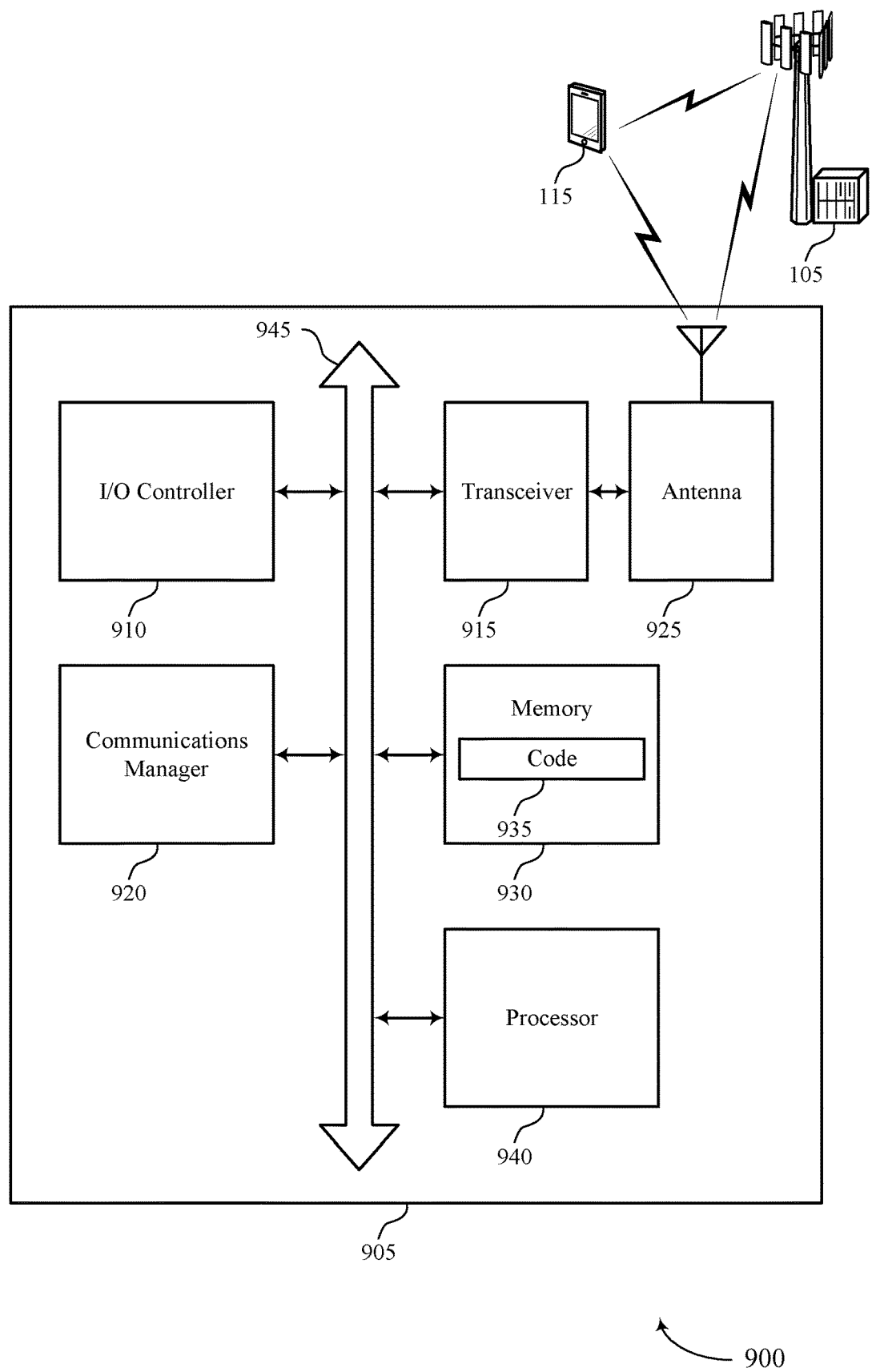
FIG. 9 shows a diagram of a system including a device that supports enhancing standalone acquisition timelines for millimeter wave devices in accordance with aspects of the present disclosure.

FIG. 9 shows a diagram of a system 900 including a device 905 that supports enhancing standalone acquisition timelines for millimeter wave devices in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting enhancing standalone acquisition timelines for millimeter wave devices). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a first base station, control signaling indicating one or more frequency bands on which one or more neighbor base stations operate that are associated with a first geographic location of the first base station. The communications manager 920 may be configured as or otherwise support a means for performing, based on the control signaling, a frequency scanning procedure using at least one frequency band of the one or more frequency bands to select a first neighbor base station of the one or more neighbor base stations. The communications manager 920 may be configured as or otherwise support a means for establishing connectivity with the first neighbor base station based on the frequency scanning procedure.

By including or configuring the communications manager 920 in accordance with examples as described herein, the device 905 may support techniques for increasing system efficiency and decreasing power consumption of UEs based on the techniques described herein that enable the UE to avoid prolonged band scans on mmW. The described techniques support improved communication reliability, reduced latency, improved user experience related to reduced processing, reduced power consumption, more efficient utilization of communication resources, improved coordination between devices, longer battery life, improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of enhancing standalone acquisition timelines for millimeter wave devices as described herein, or the processor 940 and the memory 930 may be otherwise configured to perform or support such operations.

Figure 10:
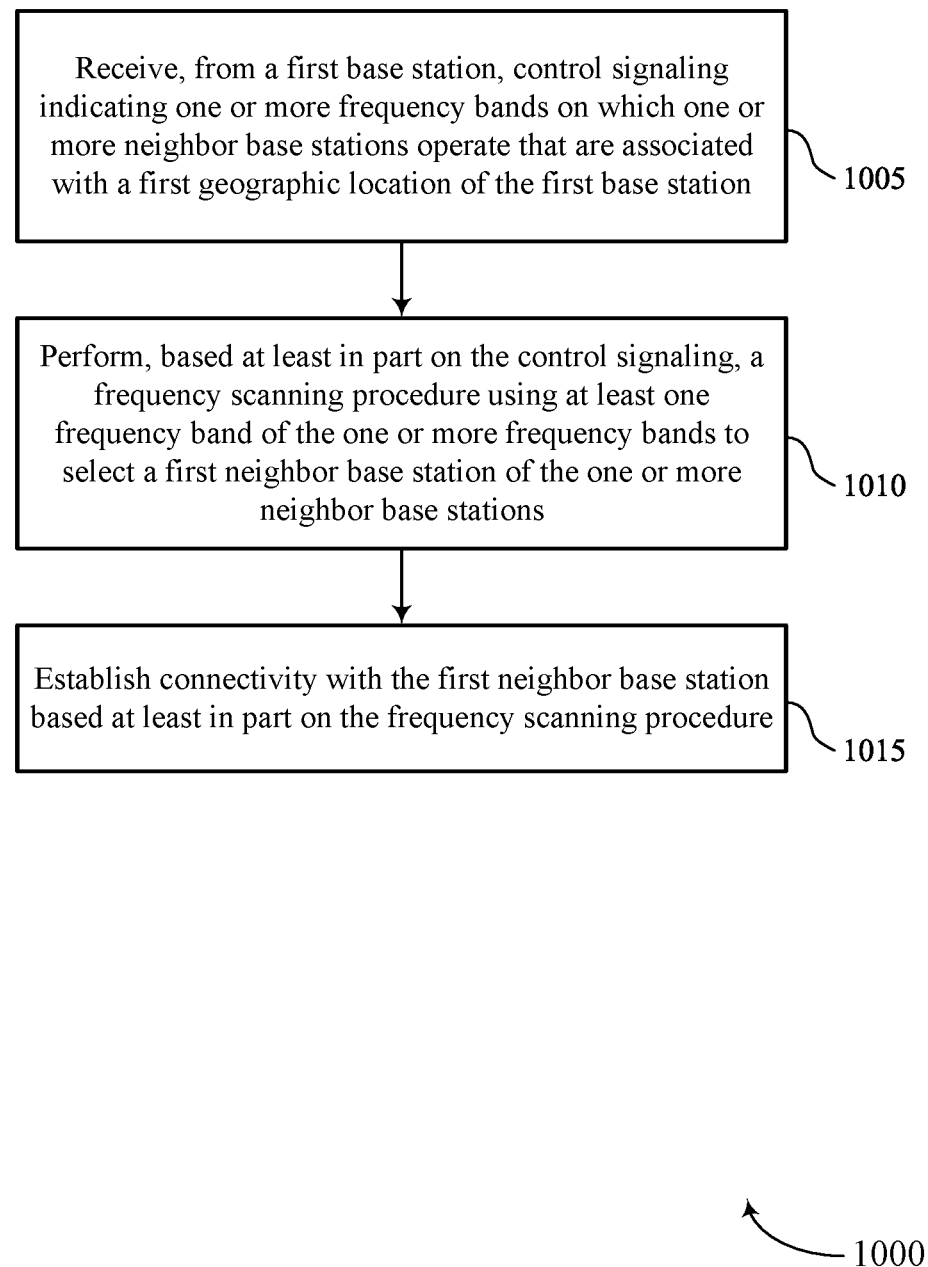
FIGS. 10 and 11 show flowcharts illustrating methods that support enhancing standalone acquisition timelines for millimeter wave devices in accordance with aspects of the present disclosure.

FIG. 10 shows a flowchart illustrating a method 1000 that supports enhancing standalone acquisition timelines for millimeter wave devices in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a first base station, control signaling indicating one or more frequency bands on which one or more neighbor base stations operate that are associated with a first geographic location of the first base station. The operations of 1005 may be performed in accordance with examples as disclosed herein. In some examples, aspects of the operations of 1005 may be performed by a control manager 825 as described with reference to FIG. 8.

At 1010, the method may include performing, based on the control signaling, a frequency scanning procedure using at least one frequency band of the one or more frequency bands to select a first neighbor base station of the one or more neighbor base stations. The operations of 1010 may be performed in accordance with examples as disclosed herein.

In some examples, aspects of the operations of 1010 may be performed by a scanning manager 830 as described with reference to FIG. 8.

At 1015, the method may include establishing connectivity with the first neighbor base station based on the frequency scanning procedure. The operations of 1015 may be performed in accordance with examples as disclosed herein. In some examples, aspects of the operations of 1015 may be performed by a connectivity manager 835 as described with reference to FIG. 8.

Figure 11:
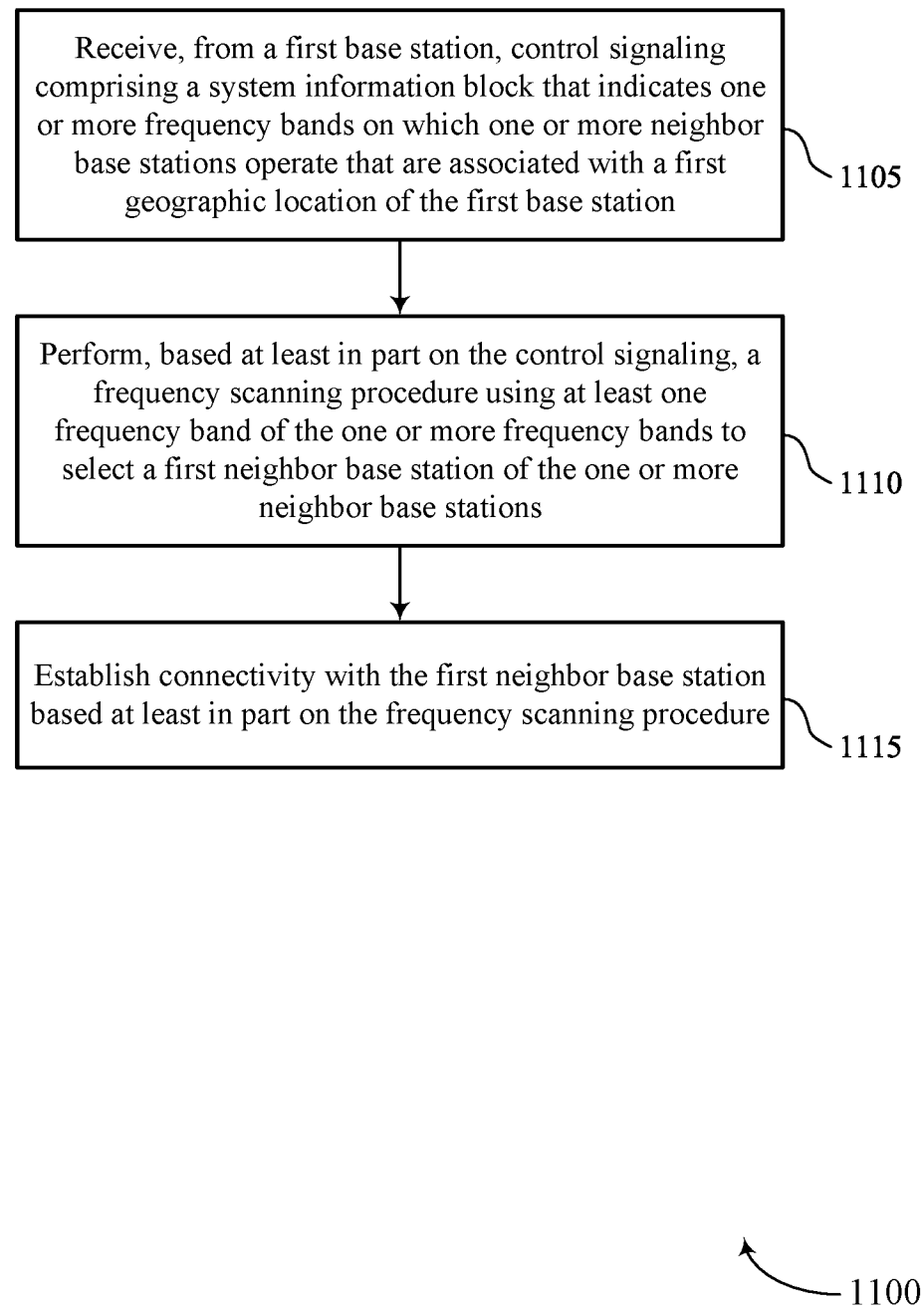

FIG. 11 shows a flowchart illustrating a method 1100 that supports enhancing standalone acquisition timelines for millimeter wave devices in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a first base station, control signaling including a system information block indicating one or more frequency bands on which one or more neighbor base stations operate that are associated with a first geographic location of the first base station. The operations of 1105 may be performed in accordance with examples as disclosed herein. In some examples, aspects of the operations of 1105 may be performed by a control manager 825 as described with reference to FIG. 8.

At 1110, the method may include performing, based on the control signaling, a frequency scanning procedure using at least one frequency band of the one or more frequency bands to select a first neighbor base station of the one or more neighbor base stations. The operations of 1110 may be performed in accordance with examples as disclosed herein. In some examples, aspects of the operations of 1110 may be performed by a scanning manager 830 as described with reference to FIG. 8.

At 1115, the method may include establishing connectivity with the first neighbor base station based on the frequency scanning procedure. The operations of 1115 may be performed in accordance with examples as disclosed herein. In some examples, aspects of the operations of 1115 may be performed by a connectivity manager 835 as described with reference to FIG. 8.

The following provides an overview of aspects of the present disclosure:

Aspect 1: A method for wireless communication at a UE, comprising: receiving, from a first base station, control signaling indicating one or more frequency bands on which one or more neighbor base stations operate that are associated with a first geographic location of the first base station; performing, based at least in part on the control signaling, a frequency scanning procedure using at least one frequency band of the one or more frequency bands to select a first neighbor base station of the one or more neighbor base stations; and establishing connectivity with the first neighbor base station based at least in part on the frequency scanning procedure.

Aspect 2: The method of aspect 1, wherein receiving the control signaling comprises: receiving the control signaling comprising a system information block indicating the one or more frequency bands on which the one or more neighbor base stations operate that are associated with the first geographic location.

Aspect 3: The method of any of aspects 1 through 2, further comprising: receiving, from the first neighbor base station, second control signaling comprising a second system information block indicating one or more second frequency bands on which one or more second neighbor base stations operate that are associated with a second geographic location.

Aspect 4: The method of aspect 3, further comprising: performing, based at least in part on the second control signaling, a second frequency scanning procedure using at least one frequency band of the one or more second frequency bands to select a second neighbor base station of the one or more second neighbor base stations; and establishing connectivity with the second neighbor base station operating using a second frequency band of the one or more second frequency bands.

Aspect 5: The method of any of aspects 1 through 4, wherein performing the frequency scanning procedure further comprises: performing the frequency scanning procedure to identify one or more additional frequency bands other than the one or more frequency bands indicated via the control signaling.

Aspect 6: The method of claim 1, further comprising: storing, in a database, a link between the one or more frequency bands and the first geographic location.

Aspect 7: The method of claim 1, further comprising: updating a database to associate the one or more frequency bands with the first geographic location.

Aspect 8: The method of claim 7, wherein the updating comprises associating a new radio cell global identifier of the first neighbor base station with the first frequency band.

Aspect 9: The method of claim 1, further comprising: identifying one or more additional frequency bands other than the one or more frequency bands indicated via the control signaling based at least in part on querying an acquisition database indicating one or more base stations with which the UE previously established connectivity corresponding to the first geographic location, wherein the frequency scanning procedure is performed using at least one frequency band of the one or more additional frequency bands.

Aspect 10: The method of aspect 9, further comprising: performing the frequency scanning procedure that prioritizes at least one operating frequency of the one or more additional frequency bands over a second frequency band based at least in part on the at least one operating frequency being in the acquisition database and the second frequency band not being included in the acquisition database.

Aspect 11: The method of any of aspects 1 through 10, wherein performing the frequency scanning procedure further comprises: performing a scan to identify one or more cells; and performing a band scan of one or more millimeter wave bands associated with the identified one or more cells, wherein the selecting of the first neighbor base station is based at least in part on the performing the band scan of the one or more millimeter wave bands.

Aspect 12: The method of any of aspects 1 through 11, wherein performing the frequency scanning procedure further comprises: performing a scan of one or more millimeter wave frequency bands that are not associated with the control signaling or a scan of one or more millimeter wave bands associated with identified cells, wherein the selecting of the first neighbor base station is based at least in part on the performing the scan of the one or more millimeter wave frequency bands.

Aspect 13: The method of any of aspects 1 through 12, wherein performing the frequency scanning procedure further comprises: performing the frequency scanning procedure over a set of frequency bands in a prioritized order indicated in a list, or that indicates to prioritize scanning bands in frequency range one, or that indicates to prioritize scanning of one or more millimeter wave frequencies associated with the one or more neighbor base stations, or that indicates to prioritize scanning of one or more additional millimeter wave frequencies identified during a prior frequency scanning procedure associated with the first geographic location, or a combination thereof.

Aspect 14: The method of any of aspects 1 through 13, wherein performing the frequency scanning procedure further comprises: performing the frequency scanning procedure that prioritizes scanning of at least one millimeter wave frequency of the one or more millimeter wave frequencies corresponding to the first base station over a second frequency band.

Aspect 15: The method of any of aspects 1 through 14, wherein performing the frequency scanning procedure further comprises: scanning a millimeter wave operating frequency associated with a loss of service.

Aspect 16: The method of any of aspects 1 through 15, wherein performing the frequency scanning procedure further comprises: identifying one or more secondary cell group cells corresponding to a dual connectivity mode; mapping the one or more secondary cell group cells to one or more primary cells; and adding the mapping and the one or more secondary cell group cells to a database.

Aspect 17: The method of any of aspects 1 through 16, wherein performing the frequency scanning procedure further comprises: performing the frequency scanning procedure that prioritizes scanning one or more millimeter wave frequencies of the one or more frequency bands indicated in the control signaling.

Aspect 18: The method of any of aspects 1 through 17, wherein the one or more frequency bands comprises one or more millimeter wave frequency bands or one or more millimeter wave frequencies, or a combination thereof.

Aspect 19: The method of any of aspects 1 through 18, wherein the frequency scanning procedure comprises a cell reselection procedure, or a cell redirection procedure, or a cell handover procedure, or a combination thereof.

Aspect 20: The method of any of aspects 1 through 19, further comprising: associating a new radio cell global identifier of the first base station with the first geographic location of the first base station.

Aspect 21: The method of aspect 20, wherein the new radio cell global identifier includes a global cell identity based at least in part on a public land mobile network and a system information block type.

Aspect 22: An apparatus for wireless communication at a UE, comprising a processor; memory coupled with the processor; and instructions stored in the memory and executable by the processor to cause the apparatus to perform a method of any of aspects 1 through 21.

Aspect 23: An apparatus for wireless communication at a UE, comprising at least one means for performing a method of any of aspects 1 through 21.

Aspect 24: A non-transitory computer-readable medium storing code for wireless communication at a UE, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a first base station, control signaling indicating one or more frequency bands on which one or more neighbor base stations operate that are associated with a first geographic location of the first base station;
   performing, based at least in part on the control signaling, a frequency scanning procedure using at least one frequency band of the one or more frequency bands to select a first neighbor base station of the one or more neighbor base stations;
   establishing connectivity with the first neighbor base station based at least in part on the frequency scanning procedure; and
   identifying one or more additional frequency bands other than the one or more frequency bands indicated via the control signaling based at least in part on querying an acquisition database indicating one or more base stations with which the UE previously established connectivity corresponding to the first geographic location, wherein the frequency scanning procedure is performed using at least one frequency band of the one or more additional frequency bands.

2. The method of claim 1, further comprising:
   receiving, from the first neighbor base station, second control signaling comprising a second system information block indicating one or more second frequency bands on which one or more second neighbor base stations operate that are associated with a second geographic location.

3. The method of claim 2, further comprising:
   performing, based at least in part on the second control signaling, a second frequency scanning procedure using at least one frequency band of the one or more second frequency bands to select a second neighbor base station of the one or more second neighbor base stations; and
   establishing connectivity with the second neighbor base station operating using a second frequency band of the one or more second frequency bands.

4. The method of claim 1, wherein performing the frequency scanning procedure further comprises:
   performing the frequency scanning procedure to identify one or more additional frequency bands other than the one or more frequency bands indicated via the control signaling.

5. The method of claim 1, further comprising:
   storing, in a database, a link between the one or more frequency bands and the first geographic location.

6. The method of claim 1, further comprising:
   updating a database to associate the one or more frequency bands with the first geographic location.

7. The method of claim 6, wherein the updating comprises associating a new radio cell global identifier of the first neighbor base station with the one or more frequency bands.

8. The method of claim 1, further comprising:
   performing the frequency scanning procedure that prioritizes at least one operating frequency of the one or more additional frequency bands over a second frequency band based at least in part on the at least one operating frequency being in the acquisition database and the second frequency band not being included in the acquisition database.

9. The method of claim 1, wherein performing the frequency scanning procedure further comprises:
performing a scan to identify one or more cells; and
performing a band scan of one or more millimeter wave bands associated with the identified one or more cells, wherein the establishing connectivity with the first neighbor base station is based at least in part on the performing the band scan of the one or more millimeter wave bands.

10. The method of claim 1, wherein performing the frequency scanning procedure further comprises:
performing a scan of one or more millimeter wave frequency bands that are not associated with the control signaling or a scan of one or more millimeter wave bands associated with identified cells, wherein the establishing connectivity with the first neighbor base station is based at least in part on the performing the scan of the one or more millimeter wave frequency bands.

11. The method of claim 1, wherein performing the frequency scanning procedure further comprises:
performing the frequency scanning procedure over a set of frequency bands in a prioritized order indicated in a list, or that indicates to prioritize scanning bands in frequency range one, or that indicates to prioritize scanning of one or more millimeter wave frequencies associated with the one or more neighbor base stations, or that indicates to prioritize scanning of one or more additional millimeter wave frequencies identified during a prior frequency scanning procedure associated with the first geographic location, or a combination thereof.

12. The method of claim 1, wherein performing the frequency scanning procedure further comprises:
performing the frequency scanning procedure that prioritizes scanning of at least one millimeter wave frequency of one or more millimeter wave frequencies corresponding to the first neighbor base station over a second frequency band.

13. The method of claim 1, wherein performing the frequency scanning procedure further comprises:
scanning a millimeter wave operating frequency associated with a loss of service.

14. The method of claim 1, wherein performing the frequency scanning procedure further comprises:
identifying one or more secondary cell group cells corresponding to a dual connectivity mode;
mapping the one or more secondary cell group cells to one or more primary cells; and
adding the mapping and the one or more secondary cell group cells to a database.

15. The method of claim 1, wherein performing the frequency scanning procedure further comprises:
performing the frequency scanning procedure that prioritizes scanning one or more millimeter wave frequencies of the one or more frequency bands indicated in the control signaling.

16. The method of claim 1, wherein the one or more frequency bands comprises one or more millimeter wave frequency bands or one or more millimeter wave frequencies, or a combination thereof.

17. The method of claim 1, wherein the frequency scanning procedure comprises a cell reselection procedure, or a cell redirection procedure, or a cell handover procedure, or a combination thereof.

18. The method of claim 1, further comprising:
associating a new radio cell global identifier of the first base station with the first geographic location of the first base station.

19. The method of claim 18, wherein the new radio cell global identifier includes a global cell identity based at least in part on a public land mobile network and a system information block type.

20. The method of claim 1, wherein receiving the control signaling comprises:
receiving the control signaling comprising a system information block indicating the one or more frequency bands on which the one or more neighbor base stations operate that are associated with the first geographic location.

21. An apparatus for wireless communication at a user equipment (UE), comprising:
a processor;
memory coupled with the processor; and
instructions stored in the memory and executable by the processor to cause the apparatus to:
receive, from a first base station, control signaling indicating one or more frequency bands on which one or more neighbor base stations operate that are associated with a first geographic location of the first base station;
perform, based at least in part on the control signaling, a frequency scanning procedure using at least one frequency band of the one or more frequency bands to select a first neighbor base station of the one or more neighbor base stations;
establish connectivity with the first neighbor base station based at least in part on the frequency scanning procedure; and
identifying one or more additional frequency bands other than the one or more frequency bands indicated via the control signaling based at least in part on querying an acquisition database indicating one or more base stations with which the UE previously established connectivity corresponding to the first geographic location, wherein the frequency scanning procedure is performed using at least one frequency band of the one or more additional frequency bands.

22. The apparatus of claim 21, wherein the instructions are further executable by the processor to cause the apparatus to:
receive, from the first neighbor base station, second control signaling comprising a second system information block indicating one or more second frequency bands on which one or more second neighbor base stations operate that are associated with a second geographic location.

23. The apparatus of claim 22, wherein the instructions are further executable by the processor to cause the apparatus to:
perform, based at least in part on the second control signaling, a second frequency scanning procedure using at least one frequency band of the one or more second frequency bands to select a second neighbor base station of the one or more second neighbor base stations; and
establish connectivity with the second neighbor base station operating using a second frequency band of the one or more second frequency bands.

24. The apparatus of claim 21, wherein the instructions to perform the frequency scanning procedure are further executable by the processor to cause the apparatus to:

perform the frequency scanning procedure to identify one or more additional frequency bands other than the one or more frequency bands indicated via the control signaling.

25. The apparatus of claim 21, wherein the instructions are further executable by the processor to cause the apparatus to:
store, in a database, a link between the one or more frequency bands and the first geographic location.

26. The apparatus of claim 21, wherein the instructions are further executable by the processor to cause the apparatus to:
update a database to associate the one or more frequency bands with the first geographic location.

27. An apparatus for wireless communication at a user equipment (UE), comprising:
means for receiving, from a first base station, control signaling indicating one or more frequency bands on which one or more neighbor base stations operate that are associated with a first geographic location of the first base station;
means for performing, based at least in part on the control signaling, a frequency scanning procedure using at least one frequency band of the one or more frequency bands to select a first neighbor base station of the one or more neighbor base stations;
means for establishing connectivity with the first neighbor base station based at least in part on the frequency scanning procedure; and
means for identifying one or more additional frequency bands other than the one or more frequency bands indicated via the control signaling based at least in part on querying an acquisition database indicating one or more base stations with which the UE previously established connectivity corresponding to the first geographic location, wherein the frequency scanning procedure is performed using at least one frequency band of the one or more additional frequency bands.

28. A non-transitory computer-readable medium storing code for wireless communication at a user equipment (UE), the code comprising instructions executable by a processor to:
receive, from a first base station, control signaling indicating one or more frequency bands on which one or more neighbor base stations operate that are associated with a first geographic location of the first base station;
perform, based at least in part on the control signaling, a frequency scanning procedure using at least one frequency band of the one or more frequency bands to select a first neighbor base station of the one or more neighbor base stations;
establish connectivity with the first neighbor base station based at least in part on the frequency scanning procedure; and
identify one or more additional frequency bands other than the one or more frequency bands indicated via the control signaling based at least in part on querying an acquisition database indicating one or more base stations with which the UE previously established connectivity corresponding to the first geographic location, wherein the frequency scanning procedure is performed using at least one frequency band of the one or more additional frequency bands.

* * * * *